United States Patent
Haegermarck et al.

(10) Patent No.: US 11,169,533 B2
(45) Date of Patent: Nov. 9, 2021

(54) ROBOTIC CLEANING DEVICE AND A METHOD AT THE ROBOTIC CLEANING DEVICE OF PERFORMING CLIFF DETECTION

(71) Applicant: Aktiebolaget Electrolux, Stockholm (SE)

(72) Inventors: Anders Haegermarck, Trångsund (SE); Petter Forsberg, Stockholm (SE); Magnus Lindhé, Stockholm (SE)

(73) Assignee: Aktiebolaget Electrolux, Stockholm (SE)

( * ) Notice: Subject to any disclaimer, the term of this patent is extended or adjusted under 35 U.S.C. 154(b) by 272 days.

(21) Appl. No.: 16/083,161

(22) PCT Filed: Mar. 15, 2016

(86) PCT No.: PCT/EP2016/055547
§ 371 (c)(1),
(2) Date: Sep. 7, 2018

(87) PCT Pub. No.: WO2017/157421
PCT Pub. Date: Sep. 21, 2017

(65) Prior Publication Data
US 2019/0079531 A1 Mar. 14, 2019

(51) Int. Cl.
*G05D 1/02* (2020.01)
*A47L 11/40* (2006.01)
(Continued)

(52) U.S. Cl.
CPC ........ *G05D 1/0248* (2013.01); *A47L 11/4061* (2013.01); *G01S 17/46* (2013.01);
(Continued)

(58) Field of Classification Search
CPC ....... G01S 17/46; G01S 17/89; G05D 1/0248; Y10S 901/01; A47L 9/00; A47L 11/40; A47L 9/009; A47L 5/00; A47L 2201/04
(Continued)

(56) References Cited

U.S. PATENT DOCUMENTS 1,286,321 A 12/1918 Hoover
1,401,007 A 12/1921 Staples
(Continued)

FOREIGN PATENT DOCUMENTS

CA 2154758 6/1995
CN 1116818 2/1996
(Continued)

OTHER PUBLICATIONS

Poisson-driven dirt maps for efficient robot cleaning; Jürgen Hess;Maximilian Beinhofer;Daniel Kuhner;Philipp Ruchti;Wolfram Burgard; 2013 IEEE International Conference on Robotics and Automation; Year: 2013; IEEE Conference Paper (year: 2013).*
(Continued)

*Primary Examiner* — Cuong H Nguyen
(74) *Attorney, Agent, or Firm* — RatnerPrestia

(57) ABSTRACT

A robotic cleaning device and a method at the robotic cleaning device of performing cliff detection along a surface over which the robotic cleaning device moves. The method includes illuminating the surface with at least one light source, capturing an image of the surface, detecting at least one illuminated section in the captured image, and determining distance to objects in the at least one illuminated section of the captured image. The method further comprises comparing at least two of the determined distances and detecting an object in the captured image as a cliff when cliff
(Continued)

when a relation between the at least two compared determined distances complies with a predetermined increase criterion.

12 Claims, 7 Drawing Sheets

(51) Int. Cl.
  *G01S 17/46* (2006.01)
  *G01S 17/931* (2020.01)
  *A47L 9/00* (2006.01)
(52) U.S. Cl.
  CPC .............. *G01S 17/931* (2020.01); *A47L 9/00* (2013.01); *A47L 9/009* (2013.01); *A47L 2201/04* (2013.01); *G05D 2201/0203* (2013.01)
(58) Field of Classification Search
  USPC ......... 700/259; 701/23, 28; 382/153; 134/18
  See application file for complete search history.

(56) References Cited

U.S. PATENT DOCUMENTS

| | | |
|---|---|---|
| 3,010,129 A | 11/1961 | Moore |
| 3,233,274 A | 2/1966 | Kroll |
| 3,550,714 A | 12/1970 | Bellinger |
| 3,570,227 A | 3/1971 | Bellinger |
| 3,713,505 A | 1/1973 | Muller |
| 3,837,028 A | 9/1974 | Bridge |
| 4,028,765 A | 6/1977 | Liebscher |
| 4,036,147 A | 7/1977 | Westling |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzold |
| 4,627,511 A | 12/1986 | Yajima |
| 4,647,209 A | 3/1987 | Neukomm |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,918,607 A | 4/1990 | Wible |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koharagi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | Maali |
| 5,353,224 A | 10/1994 | Lee |
| 5,367,458 A | 11/1994 | Roberts |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,518,552 A | 5/1996 | Tanoue |
| 5,534,762 A | 7/1996 | Kim |
| 5,548,511 A | 8/1996 | Bancroft |
| 5,560,077 A | 10/1996 | Crotchett |
| 5,568,589 A | 10/1996 | Hwang |
| 5,621,291 A | 4/1997 | Lee |
| 5,634,237 A | 6/1997 | Paranjpe |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,825,981 A | 10/1998 | Matsuda |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | Kawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | vandenBerg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 5,999,865 A | 12/1999 | Bloomquist |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,251,551 B1 | 6/2001 | Kunze-Concewitz |
| 6,255,793 B1 | 7/2001 | Peless |
| 6,263,989 B1 | 7/2001 | Won |
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |

(56) References Cited

U.S. PATENT DOCUMENTS

| | | | |
|---|---|---|---|
| 6,370,452 | B1 | 4/2002 | Pfister |
| 6,370,453 | B2 | 4/2002 | Sommer |
| 6,374,157 | B1 | 4/2002 | Takamura |
| 6,381,801 | B1 | 5/2002 | Clemons, Sr. |
| 6,389,329 | B1 | 5/2002 | Colens |
| 6,413,149 | B1 | 7/2002 | Wada |
| 6,417,641 | B2 | 7/2002 | Peless |
| 6,431,296 | B1 | 8/2002 | Won |
| 6,438,456 | B1 | 8/2002 | Feddema |
| 6,443,509 | B1 | 9/2002 | Levin |
| 6,457,199 | B1 | 10/2002 | Frost |
| 6,457,206 | B1 | 10/2002 | Judson |
| 6,459,955 | B1 | 10/2002 | Bartsch |
| 6,465,982 | B1 | 10/2002 | Bergvall |
| 6,481,515 | B1 | 11/2002 | Kirkpatrick |
| 6,482,678 | B1 | 11/2002 | Frost |
| 6,493,612 | B1 | 12/2002 | Bisset |
| 6,493,613 | B2 | 12/2002 | Peless |
| 6,496,754 | B2 | 12/2002 | Song |
| 6,504,610 | B1 | 1/2003 | Bauer |
| 6,519,804 | B1 | 2/2003 | Vujik |
| 6,525,509 | B1 | 2/2003 | Petersson |
| D471,243 | S | 3/2003 | Cioffi |
| 6,532,404 | B2 | 3/2003 | Colens |
| 6,535,793 | B2 | 3/2003 | Allard |
| 6,571,415 | B2 | 6/2003 | Gerber |
| 6,580,246 | B2 | 6/2003 | Jacobs |
| 6,581,239 | B1 | 6/2003 | Dyson |
| 6,594,844 | B2 | 7/2003 | Jones |
| 6,597,143 | B2 | 7/2003 | Song |
| 6,601,265 | B1 | 8/2003 | Burlington |
| 6,605,156 | B1 | 8/2003 | Clark |
| 6,609,962 | B1 | 8/2003 | Wakabayashi |
| 6,611,120 | B2 | 8/2003 | Song |
| 6,611,318 | B2 | 8/2003 | LaPolice |
| 6,615,108 | B1 | 9/2003 | Peless |
| 6,615,885 | B1 | 9/2003 | Ohm |
| 6,633,150 | B1 | 10/2003 | Wallach |
| 6,637,446 | B2 | 10/2003 | Frost |
| 6,658,325 | B2 | 12/2003 | Zweig |
| 6,661,239 | B1 | 12/2003 | Ozick |
| 6,662,889 | B2 | 12/2003 | De Fazio |
| 6,667,592 | B2 | 12/2003 | Jacobs |
| 6,668,951 | B2 | 12/2003 | Won |
| 6,671,592 | B1 | 12/2003 | Bisset |
| 6,690,134 | B1 | 2/2004 | Jones |
| 6,726,823 | B1 | 4/2004 | Wang |
| 6,732,826 | B2 | 5/2004 | Song |
| 6,745,431 | B2 | 6/2004 | Dijksman |
| 6,748,297 | B2 | 6/2004 | Song |
| 6,769,004 | B2 | 7/2004 | Barrett |
| 6,774,596 | B1 | 8/2004 | Bisset |
| 6,775,871 | B1 | 8/2004 | Finch |
| 6,781,338 | B2 | 8/2004 | Jones |
| 6,809,490 | B2 | 10/2004 | Jones |
| 6,810,305 | B2 | 10/2004 | Kirkpatrick, Jr. |
| 6,820,801 | B2 | 11/2004 | Kaneko |
| 6,841,963 | B2 | 1/2005 | Song |
| 6,845,297 | B2 | 1/2005 | Allard |
| 6,850,024 | B2 | 2/2005 | Peless |
| 6,859,010 | B2 | 2/2005 | Jeon |
| 6,859,976 | B2 | 3/2005 | Plankenhorn |
| 6,860,206 | B1 | 3/2005 | Rudakevych |
| 6,868,307 | B2 | 3/2005 | Song |
| 6,869,633 | B2 | 3/2005 | Sus |
| 6,870,792 | B2 | 3/2005 | Chiappetta |
| 6,882,334 | B1 | 4/2005 | Meyer |
| 6,883,201 | B2 | 4/2005 | Jones |
| 6,885,912 | B2 | 4/2005 | Peless |
| 6,901,624 | B2 | 6/2005 | Mori |
| 6,925,679 | B2 | 8/2005 | Wallach |
| D510,066 | S | 9/2005 | Hickey |
| 6,938,298 | B2 | 9/2005 | Aasen |
| 6,939,208 | B2 | 9/2005 | Kamimura |
| 6,940,291 | B1 | 9/2005 | Ozick |
| 6,941,199 | B1 | 9/2005 | Bottomley |
| 6,942,548 | B2 | 9/2005 | Wada |
| 6,956,348 | B2 | 10/2005 | Landry |
| 6,957,712 | B2 | 10/2005 | Song |
| 6,964,312 | B2 | 11/2005 | Maggio |
| 6,965,209 | B2 | 11/2005 | Jones |
| 6,967,275 | B2 | 11/2005 | Ozick |
| 6,971,140 | B2 | 12/2005 | Kim |
| 6,971,141 | B1 | 12/2005 | Tak |
| 6,984,952 | B2 | 1/2006 | Peless |
| 7,000,623 | B2 | 2/2006 | Welsh |
| 7,004,269 | B2 | 2/2006 | Song |
| 7,013,200 | B2 | 3/2006 | Wakui |
| 7,013,527 | B2 | 3/2006 | Thomas, Sr. |
| 7,015,831 | B2 | 3/2006 | Karlsson |
| 7,024,278 | B2 | 4/2006 | Chiappetta |
| 7,031,805 | B2 | 4/2006 | Lee |
| 7,040,968 | B2 | 5/2006 | Kamimura |
| 7,042,342 | B2 | 5/2006 | Luo |
| 7,043,794 | B2 | 5/2006 | Conner |
| 7,050,926 | B2 | 5/2006 | Theurer |
| 7,053,578 | B2 | 5/2006 | Diehl |
| 7,053,580 | B2 | 5/2006 | Aldred |
| 7,054,716 | B2 | 5/2006 | McKee |
| 7,059,012 | B2 | 6/2006 | Song |
| 7,079,923 | B2 | 7/2006 | Abramson |
| 7,082,350 | B2 | 7/2006 | Skoog |
| D526,753 | S | 8/2006 | Tani |
| 7,085,624 | B2 | 8/2006 | Aldred |
| 7,103,449 | B2 | 9/2006 | Woo |
| 7,113,847 | B2 | 9/2006 | Chmura |
| 7,117,067 | B2 | 10/2006 | McLurkin |
| 7,133,745 | B2 | 11/2006 | Wang |
| 7,134,164 | B2 | 11/2006 | Alton |
| 7,135,992 | B2 | 11/2006 | Karlsson |
| 7,143,696 | B2 | 12/2006 | Rudakevych |
| 7,145,478 | B2 | 12/2006 | Goncalves |
| 7,150,068 | B1 | 12/2006 | Ragner |
| 7,155,308 | B2 | 12/2006 | Jones |
| 7,155,309 | B2 | 12/2006 | Peless |
| 7,162,338 | B2 | 1/2007 | Goncalves |
| 7,167,775 | B2 | 1/2007 | Abramson |
| 7,173,391 | B2 | 2/2007 | Jones |
| 7,174,238 | B1 | 2/2007 | Zweig |
| 7,177,737 | B2 | 2/2007 | Karlsson |
| 7,184,586 | B2 | 2/2007 | Jeon |
| 7,185,396 | B2 | 3/2007 | Im |
| 7,185,397 | B2 | 3/2007 | Stuchlik |
| 7,188,000 | B2 | 3/2007 | Chiappetta |
| 7,196,487 | B2 | 3/2007 | Jones |
| 7,199,711 | B2 | 4/2007 | Field |
| 7,200,892 | B2 | 4/2007 | Kim |
| 7,202,630 | B2 | 4/2007 | Dan |
| 7,206,677 | B2 | 4/2007 | Hulden |
| 7,207,081 | B2 | 4/2007 | Gerber |
| 7,208,892 | B2 | 4/2007 | Tondra |
| 7,213,298 | B2 | 5/2007 | Cipolla |
| 7,213,663 | B2 | 5/2007 | Kim |
| 7,222,390 | B2 | 5/2007 | Cipolla |
| 7,225,500 | B2 | 6/2007 | Diehl |
| 7,237,298 | B2 | 7/2007 | Reindle |
| 7,240,396 | B2 | 7/2007 | Thomas, Sr. |
| 7,246,405 | B2 | 7/2007 | Yan |
| 7,248,951 | B2 | 7/2007 | Hulden |
| 7,251,853 | B2 | 8/2007 | Park |
| 7,254,464 | B1 | 8/2007 | McLurkin |
| 7,254,859 | B2 | 8/2007 | Gerber |
| 7,269,877 | B2 | 9/2007 | Tondra |
| 7,272,467 | B2 | 9/2007 | Goncalves |
| 7,272,868 | B2 | 9/2007 | Im |
| 7,274,167 | B2 | 9/2007 | Kim |
| 7,275,280 | B2 | 10/2007 | Haegermarck |
| 7,288,912 | B2 | 10/2007 | Landry |
| D556,961 | S | 12/2007 | Swyst |
| 7,303,776 | B2 | 12/2007 | Sus |
| 7,324,870 | B2 | 1/2008 | Lee |
| 7,331,436 | B1 | 2/2008 | Pack |
| 7,332,890 | B2 | 2/2008 | Cohen |
| 7,343,221 | B2 | 3/2008 | Ann |

(56) References Cited

U.S. PATENT DOCUMENTS

| | | |
|---|---|---|
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DeFazio |
| 7,369,460 B2 | 5/2008 | Chiappetta |
| 7,372,004 B2 | 5/2008 | Buchner |
| 7,388,343 B2 | 6/2008 | Jones |
| 7,389,156 B2 | 6/2008 | Ziegler |
| 7,389,166 B2 | 6/2008 | Harwig |
| 7,402,974 B2 | 7/2008 | Jeon |
| 7,403,360 B2 | 7/2008 | Cunningham |
| 7,412,748 B2 | 8/2008 | Lee |
| 7,417,404 B2 | 8/2008 | Lee |
| 7,418,762 B2 | 9/2008 | Arai |
| 7,424,766 B2 | 9/2008 | Reindle |
| 7,429,843 B2 | 9/2008 | Jones |
| 7,430,455 B2 | 9/2008 | Casey |
| 7,438,766 B2 | 10/2008 | Song |
| 7,441,298 B2 | 10/2008 | Svendsen |
| 7,444,206 B2 | 10/2008 | Abramson |
| 7,448,113 B2 | 11/2008 | Jones |
| 7,459,871 B2 | 12/2008 | Landry |
| 7,464,157 B2 | 12/2008 | Okude |
| 7,474,941 B2 | 1/2009 | Kim |
| 7,480,958 B2 | 1/2009 | Song |
| 7,480,960 B2 | 1/2009 | Kim |
| D586,959 S | 2/2009 | Geringer |
| 7,489,277 B2 | 2/2009 | Sung |
| 7,489,985 B2 | 2/2009 | Ko |
| 7,499,774 B2 | 3/2009 | Barrett |
| 7,499,775 B2 | 3/2009 | Filippov |
| 7,499,776 B2 | 3/2009 | Allard |
| 7,499,804 B2 | 3/2009 | Svendsen |
| 7,503,096 B2 | 3/2009 | Lin |
| 7,515,991 B2 | 4/2009 | Egawa |
| D593,265 S | 5/2009 | Carr |
| 7,539,557 B2 | 5/2009 | Yamauchi |
| 7,546,891 B2 | 6/2009 | Won |
| 7,546,912 B1 | 6/2009 | Pack |
| 7,555,363 B2 | 6/2009 | Augenbraun |
| 7,556,108 B2 | 7/2009 | Won |
| 7,559,269 B2 | 7/2009 | Rudakevych |
| 7,564,571 B2 | 7/2009 | Karabassi |
| 7,566,839 B2 | 7/2009 | Hukuba |
| 7,567,052 B2 | 7/2009 | Jones |
| 7,568,259 B2 | 8/2009 | Yan |
| 7,568,536 B2 | 8/2009 | Yu |
| 7,571,511 B2 | 8/2009 | Jones |
| 7,573,403 B2 | 8/2009 | Goncalves |
| 7,574,282 B2 | 8/2009 | Petersson |
| 7,578,020 B2 | 8/2009 | Jaworski |
| 7,579,803 B2 | 8/2009 | Jones |
| 7,581,282 B2 | 9/2009 | Woo |
| 7,597,162 B2 | 10/2009 | Won |
| 7,600,521 B2 | 10/2009 | Woo |
| 7,600,593 B2 | 10/2009 | Filippov |
| 7,603,744 B2 | 10/2009 | Reindle |
| 7,604,675 B2 | 10/2009 | Makarov |
| 7,610,651 B2 | 11/2009 | Baek |
| 7,613,543 B2 | 11/2009 | Petersson |
| 7,620,476 B2 | 11/2009 | Morse |
| 7,636,982 B2 | 12/2009 | Jones |
| 7,647,144 B2 | 1/2010 | Haegermarck |
| 7,650,666 B2 | 1/2010 | Jang |
| 7,654,348 B2 | 2/2010 | Ohm |
| 7,660,650 B2 | 2/2010 | Kawagoe |
| 7,663,333 B2 | 2/2010 | Jones |
| 7,673,367 B2 | 3/2010 | Kim |
| 7,679,532 B2 | 3/2010 | Karlsson |
| 7,688,676 B2 | 3/2010 | Chiappetta |
| 7,693,654 B1 | 4/2010 | Dietsch |
| 7,697,141 B2 | 4/2010 | Jones |
| 7,706,917 B1 | 4/2010 | Chiappetta |
| 7,706,921 B2 | 4/2010 | Jung |
| 7,709,497 B2 | 5/2010 | Christensen, IV |
| 7,711,450 B2 | 5/2010 | Im |
| 7,720,572 B2 | 5/2010 | Ziegler |
| 7,721,829 B2 | 5/2010 | Lee |
| 7,729,801 B2 | 6/2010 | Abramson |
| 7,749,294 B2 | 7/2010 | Oh |
| 7,751,940 B2 | 7/2010 | Lee |
| 7,761,954 B2 | 7/2010 | Ziegler |
| 7,765,635 B2 | 8/2010 | Park |
| 7,765,638 B2 | 8/2010 | Pineschi |
| 7,769,490 B2 | 8/2010 | Abramson |
| 7,774,158 B2 | 8/2010 | Domingues Goncalves |
| 7,779,504 B2 | 8/2010 | Lee |
| 7,780,796 B2 | 8/2010 | Shim |
| 7,784,139 B2 | 8/2010 | Sawalski |
| 7,784,570 B2 | 8/2010 | Couture |
| 7,785,544 B2 | 8/2010 | Alward |
| 7,787,991 B2 | 8/2010 | Jeung |
| 7,793,614 B2 | 9/2010 | Ericsson |
| 7,801,645 B2 | 9/2010 | Taylor |
| 7,805,220 B2 | 9/2010 | Taylor |
| 7,827,653 B1 | 11/2010 | Liu |
| 7,832,048 B2 | 11/2010 | Harwig |
| 7,835,529 B2 | 11/2010 | Hernandez |
| 7,843,431 B2 | 11/2010 | Robbins |
| 7,844,364 B2 | 11/2010 | McLurkin |
| 7,849,555 B2 | 12/2010 | Hahm |
| 7,856,291 B2 | 12/2010 | Jung |
| 7,860,608 B2 | 12/2010 | Lee |
| 7,861,365 B2 | 1/2011 | Sun |
| 7,861,366 B2 | 1/2011 | Hahm |
| 7,873,437 B2 | 1/2011 | Aldred |
| 7,877,166 B2 | 1/2011 | Harwig |
| 7,886,399 B2 | 2/2011 | Dayton |
| 7,890,210 B2 | 2/2011 | Choi |
| 7,891,045 B2 | 2/2011 | Kim |
| 7,891,289 B2 | 2/2011 | Day |
| 7,891,446 B2 | 2/2011 | Couture |
| 7,894,951 B2 | 2/2011 | Norris |
| 7,916,931 B2 | 3/2011 | Lee |
| 7,920,941 B2 | 4/2011 | Park |
| 7,921,506 B2 | 4/2011 | Baek |
| 7,926,598 B2 | 4/2011 | Rudakevych |
| 7,934,571 B2 | 5/2011 | Chiu |
| 7,937,800 B2 | 5/2011 | Yan |
| 7,942,107 B2 | 5/2011 | Vosburgh |
| 7,957,837 B2 | 6/2011 | Ziegler |
| 7,962,997 B2 | 6/2011 | Chung |
| 7,966,339 B2 | 6/2011 | Kim |
| 7,975,790 B2 | 7/2011 | Kim |
| 7,979,175 B2 | 7/2011 | Allard |
| 7,979,945 B2 | 7/2011 | Dayton |
| 7,981,455 B2 | 7/2011 | Sus |
| 7,997,118 B2 | 8/2011 | Mecca |
| 8,001,651 B2 | 8/2011 | Chang |
| 8,007,221 B1 | 8/2011 | More |
| 8,010,229 B2 | 8/2011 | Kim |
| 8,019,223 B2 | 9/2011 | Hudson |
| 8,020,657 B2 | 9/2011 | Allard |
| 8,032,978 B2 | 10/2011 | Haegermarck |
| 8,034,390 B2 | 10/2011 | Sus |
| 8,042,663 B1 | 10/2011 | Pack |
| 8,046,103 B2 | 10/2011 | Abramson |
| 8,061,461 B2 | 11/2011 | Couture |
| 8,065,778 B2 | 11/2011 | Kim |
| 8,073,439 B2 | 12/2011 | Stromberg |
| 8,074,752 B2 | 12/2011 | Rudakevych |
| 8,078,338 B2 | 12/2011 | Pack |
| 8,079,432 B2 | 12/2011 | Ohm |
| 8,082,836 B2 | 12/2011 | More |
| 8,086,419 B2 | 12/2011 | Goncalves |
| 8,087,117 B2 | 1/2012 | Kapoor |
| 8,095,238 B2 | 1/2012 | Jones |
| 8,095,336 B2 | 1/2012 | Goncalves |
| 8,107,318 B2 | 1/2012 | Chiappetta |
| 8,108,092 B2 | 1/2012 | Phillips |
| 8,109,191 B1 | 2/2012 | Rudakevych |
| 8,112,942 B2 | 2/2012 | Bohm |
| 8,113,304 B2 | 2/2012 | Won |

(56) References Cited

U.S. PATENT DOCUMENTS

| | | |
|---|---|---|
| 8,122,982 B2 | 2/2012 | Morey |
| 8,127,396 B2 | 3/2012 | Mangiardi |
| 8,127,399 B2 * | 3/2012 | Dilger .................. A47L 9/2842 15/340.1 |
| 8,127,704 B2 | 3/2012 | Vosburgh |
| 8,136,200 B2 | 3/2012 | Splinter |
| 8,150,650 B2 | 4/2012 | Goncalves |
| D659,311 S | 5/2012 | Geringer |
| 8,166,904 B2 | 5/2012 | Israel |
| 8,195,333 B2 | 6/2012 | Ziegler |
| 8,196,251 B2 | 6/2012 | Lynch |
| 8,199,109 B2 | 6/2012 | Robbins |
| 8,200,600 B2 | 6/2012 | Rosenstein |
| 8,200,700 B2 | 6/2012 | Moore |
| 8,237,389 B2 | 8/2012 | Fitch |
| 8,237,920 B2 | 8/2012 | Jones |
| 8,239,992 B2 | 8/2012 | Schnittman |
| 8,244,469 B2 | 8/2012 | Cheung |
| 8,253,368 B2 | 8/2012 | Landry |
| 8,255,092 B2 | 8/2012 | Phillips |
| 8,256,542 B2 | 9/2012 | Couture |
| 8,265,793 B2 | 9/2012 | Cross |
| 8,274,406 B2 | 9/2012 | Karlsson |
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |
| 8,295,125 B2 | 10/2012 | Chiappetta |
| D670,877 S | 11/2012 | Geringer |
| 8,308,529 B2 | 11/2012 | DAmbra |
| 8,311,674 B2 | 11/2012 | Abramson |
| 8,316,971 B2 | 11/2012 | Couture |
| 8,318,499 B2 | 11/2012 | Fritchie |
| D672,928 S | 12/2012 | Swett |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,378,613 B2 | 2/2013 | Landry |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 | 3/2013 | Jones |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburgh |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,803 B2 | 6/2013 | Cohen |
| 8,463,438 B2 | 6/2013 | Jones |
| 8,473,140 B2 | 6/2013 | Norris |
| 8,474,090 B2 | 7/2013 | Jones |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karlsson |
| 8,515,578 B2 | 8/2013 | Chiappetta |
| 8,516,651 B2 | 8/2013 | Jones |
| 8,525,995 B2 | 9/2013 | Jones |
| 8,527,113 B2 | 9/2013 | Yamauchi |
| 8,528,157 B2 | 9/2013 | Schnittman |
| 8,528,162 B2 | 9/2013 | Tang |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steltz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,671,513 B2 | 3/2014 | Yoo |
| 8,732,895 B2 | 5/2014 | Cunningham |
| 8,741,013 B2 | 6/2014 | Swett |
| 8,743,286 B2 | 6/2014 | Hasegawa |
| 8,745,194 B2 | 6/2014 | Uribe-Etxebarria Jimenez |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,881,339 B2 | 11/2014 | Gilbert, Jr. |
| 8,924,042 B2 | 12/2014 | Kim |
| 8,961,695 B2 | 2/2015 | Romanov |
| 8,985,127 B2 | 3/2015 | Konandreas |
| 8,996,172 B2 | 3/2015 | Shah |
| 9,033,079 B2 | 5/2015 | Shin |
| 9,037,396 B2 | 5/2015 | Pack |
| 9,104,206 B2 | 8/2015 | Biber et al. |
| 9,144,361 B2 | 9/2015 | Landry |
| 9,223,312 B2 | 12/2015 | Goel et al. |
| 9,259,129 B2 | 2/2016 | Jang et al. |
| 9,360,300 B2 | 6/2016 | DiBernado |
| 9,596,971 B2 | 3/2017 | Yoon |
| 9,629,514 B2 | 4/2017 | Hillen et al. |
| 9,687,132 B2 | 6/2017 | Schlischka |
| 9,775,476 B2 * | 10/2017 | Jang .................. A47L 9/009 |
| 9,939,529 B2 | 4/2018 | Haegermarck |
| 10,045,675 B2 | 8/2018 | Haegermarck |
| 10,247,669 B2 | 4/2019 | Windorfer |
| 10,296,007 B2 | 5/2019 | Vicenti |
| 2001/0004719 A1 | 6/2001 | Sommer |
| 2001/0037163 A1 | 11/2001 | Allard |
| 2002/0016649 A1 | 2/2002 | Jones |
| 2002/0091466 A1 | 7/2002 | Song |

(56) References Cited

U.S. PATENT DOCUMENTS

| | | |
|---|---|---|
| 2002/0108635 A1 | 8/2002 | Marrero |
| 2002/0121288 A1 | 9/2002 | Marrero |
| 2002/0121561 A1 | 9/2002 | Marrero |
| 2002/0164932 A1 | 11/2002 | Kamimura |
| 2002/0174506 A1 | 11/2002 | Wallach |
| 2002/0185071 A1 | 12/2002 | Guo |
| 2002/0189871 A1 | 12/2002 | Won |
| 2003/0000034 A1 | 1/2003 | Welsh |
| 2003/0025472 A1 | 2/2003 | Jones |
| 2003/0030398 A1 | 2/2003 | Jacobs |
| 2003/0120972 A1 | 6/2003 | Matsushima |
| 2003/0140449 A1 | 7/2003 | Alton |
| 2003/0159223 A1 | 8/2003 | Plankenhorn |
| 2003/0167000 A1 | 9/2003 | Mullick |
| 2003/0229421 A1 | 12/2003 | Chmura |
| 2004/0020000 A1 | 2/2004 | Jones |
| 2004/0031111 A1 | 2/2004 | Porchia |
| 2004/0031121 A1 | 2/2004 | Martin |
| 2004/0034952 A1 | 2/2004 | Ho |
| 2004/0049877 A1 | 3/2004 | Jones |
| 2004/0049878 A1 | 3/2004 | Thomas |
| 2004/0074038 A1 | 4/2004 | Im |
| 2004/0074039 A1 | 4/2004 | Kim |
| 2004/0098167 A1 | 5/2004 | Yi |
| 2004/0111184 A1 | 6/2004 | Chiappetta |
| 2004/0111827 A1 | 6/2004 | Im |
| 2004/0167667 A1 | 8/2004 | Goncalves |
| 2004/0181896 A1 | 9/2004 | Egawa |
| 2004/0182839 A1 | 9/2004 | Denney |
| 2004/0182840 A1 | 9/2004 | Denney |
| 2004/0185011 A1 | 9/2004 | Alexander |
| 2004/0187249 A1 | 9/2004 | Jones |
| 2004/0207355 A1 | 10/2004 | Jones |
| 2004/0208212 A1 | 10/2004 | Denney |
| 2004/0210343 A1 | 10/2004 | Kim |
| 2004/0220707 A1 | 11/2004 | Pallister |
| 2005/0000543 A1 | 1/2005 | Taylor et al. |
| 2005/0010331 A1 | 1/2005 | Taylor |
| 2005/0015912 A1 | 1/2005 | Kim |
| 2005/0015915 A1 | 1/2005 | Thomas |
| 2005/0021181 A1 | 1/2005 | Kim et al. |
| 2005/0028315 A1 | 2/2005 | Thomas |
| 2005/0028316 A1 | 2/2005 | Thomas |
| 2005/0042151 A1 | 2/2005 | Alward |
| 2005/0065662 A1 * | 3/2005 | Reindle ............... A47L 9/2821 701/1 |
| 2005/0085947 A1 | 4/2005 | Aldred |
| 2005/0088643 A1 | 4/2005 | Anderson |
| 2005/0156562 A1 | 7/2005 | Cohen |
| 2005/0166354 A1 | 8/2005 | Uehigashi |
| 2005/0191949 A1 | 9/2005 | Kamimura |
| 2005/0217061 A1 | 10/2005 | Reindle |
| 2005/0223514 A1 | 10/2005 | Stuchlik |
| 2005/0229340 A1 | 10/2005 | Sawalski |
| 2005/0230166 A1 | 10/2005 | Petersson |
| 2005/0234611 A1 | 10/2005 | Uehigashi |
| 2005/0251292 A1 | 11/2005 | Casey |
| 2005/0251457 A1 | 11/2005 | Kashiwagi |
| 2005/0251947 A1 | 11/2005 | Lee |
| 2005/0267629 A1 | 12/2005 | Petersson |
| 2005/0278888 A1 | 12/2005 | Reindle |
| 2005/0287038 A1 | 12/2005 | Dubrovsky |
| 2006/0009879 A1 | 1/2006 | Lynch |
| 2006/0010799 A1 | 1/2006 | Bohm |
| 2006/0020369 A1 | 1/2006 | Taylor |
| 2006/0028306 A1 | 2/2006 | Hukuba |
| 2006/0032013 A1 | 2/2006 | Kim |
| 2006/0045981 A1 | 3/2006 | Tsushi |
| 2006/0076039 A1 | 4/2006 | Song et al. |
| 2006/0095158 A1 | 5/2006 | Lee |
| 2006/0136096 A1 | 6/2006 | Chiappetta |
| 2006/0144834 A1 | 7/2006 | Denney |
| 2006/0178777 A1 | 8/2006 | Park |
| 2006/0190133 A1 | 8/2006 | Konandreas |
| 2006/0190134 A1 | 8/2006 | Ziegler |
| 2006/0190146 A1 | 8/2006 | Morse |
| 2006/0195015 A1 | 8/2006 | Mullick |
| 2006/0200281 A1 | 9/2006 | Ziegler |
| 2006/0213025 A1 | 9/2006 | Sawalski |
| 2006/0235570 A1 | 10/2006 | Jung |
| 2006/0235585 A1 | 10/2006 | Tanaka |
| 2006/0236492 A1 | 10/2006 | Sudo |
| 2006/0288519 A1 | 12/2006 | Jaworski |
| 2006/0293788 A1 | 12/2006 | Pogodin |
| 2007/0016328 A1 | 1/2007 | Ziegler |
| 2007/0021867 A1 | 1/2007 | Woo |
| 2007/0059441 A1 | 3/2007 | Greer |
| 2007/0061040 A1 | 3/2007 | Augenbraun |
| 2007/0114975 A1 | 5/2007 | Cohen |
| 2007/0118248 A1 | 5/2007 | Lee |
| 2007/0124890 A1 | 6/2007 | Erko |
| 2007/0136981 A1 * | 6/2007 | Dilger ............... A47L 9/2826 15/319 |
| 2007/0143950 A1 | 6/2007 | Lin |
| 2007/0156286 A1 | 7/2007 | Yamauchi |
| 2007/0179670 A1 | 8/2007 | Chiappetta |
| 2007/0189347 A1 | 8/2007 | Denney |
| 2007/0204426 A1 | 9/2007 | Nakagawa |
| 2007/0213892 A1 | 9/2007 | Jones |
| 2007/0214601 A1 | 9/2007 | Chung |
| 2007/0234492 A1 | 10/2007 | Svendsen |
| 2007/0244610 A1 | 10/2007 | Ozick |
| 2007/0266508 A1 | 11/2007 | Jones |
| 2007/0267230 A1 | 11/2007 | Won |
| 2007/0267570 A1 | 11/2007 | Park |
| 2007/0267998 A1 | 11/2007 | Cohen |
| 2007/0273864 A1 | 11/2007 | Cho |
| 2007/0276541 A1 | 11/2007 | Sawasaki |
| 2007/0285041 A1 | 12/2007 | Jones |
| 2007/0289267 A1 | 12/2007 | Makarov |
| 2007/0290649 A1 | 12/2007 | Jones |
| 2008/0000041 A1 | 1/2008 | Jones |
| 2008/0000042 A1 | 1/2008 | Jones |
| 2008/0001566 A1 | 1/2008 | Jones |
| 2008/0007203 A1 | 1/2008 | Cohen |
| 2008/0009964 A1 | 1/2008 | Bruemmer |
| 2008/0015738 A1 | 1/2008 | Casey |
| 2008/0016631 A1 | 1/2008 | Casey |
| 2008/0037170 A1 | 2/2008 | Saliba |
| 2008/0039974 A1 | 2/2008 | Sandin |
| 2008/0047092 A1 | 2/2008 | Schnittman |
| 2008/0051953 A1 | 2/2008 | Jones |
| 2008/0007193 A1 | 3/2008 | Bow |
| 2008/0052846 A1 | 3/2008 | Kapoor |
| 2008/0058987 A1 | 3/2008 | Ozick |
| 2008/0063400 A1 | 3/2008 | Hudson |
| 2008/0065265 A1 | 3/2008 | Ozick |
| 2008/0077278 A1 | 3/2008 | Park |
| 2008/0079383 A1 | 4/2008 | Nakamoto |
| 2008/0084174 A1 | 4/2008 | Jones |
| 2008/0086241 A1 | 4/2008 | Phillips |
| 2008/0091304 A1 | 4/2008 | Ozick |
| 2008/0091305 A1 | 4/2008 | Svendsen |
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |

(56) References Cited

U.S. PATENT DOCUMENTS

| | | |
|---|---|---|
| 2008/0209665 A1 | 9/2008 | Mangiardi |
| 2008/0221729 A1 | 9/2008 | Lavarec |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1 | 11/2008 | Schnittman |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0030551 A1 | 1/2009 | Hein |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0126143 A1 | 5/2009 | Haegermarck |
| 2009/0133720 A1 | 5/2009 | Vandenbogert |
| 2009/0145671 A1 | 6/2009 | Filippov |
| 2009/0173553 A1 | 7/2009 | Won |
| 2009/0180668 A1 | 7/2009 | Jones |
| 2009/0226113 A1 | 9/2009 | Matsumoto |
| 2009/0232506 A1 | 9/2009 | Hudson |
| 2009/0241826 A1 | 10/2009 | Vosburgh |
| 2009/0254217 A1 | 10/2009 | Pack |
| 2009/0254218 A1 | 10/2009 | Sandin |
| 2009/0265036 A1 | 10/2009 | Jamieson |
| 2009/0270015 A1 | 10/2009 | DAmbra |
| 2009/0274602 A1 | 11/2009 | Alward |
| 2009/0281661 A1 | 11/2009 | Dooley |
| 2009/0292393 A1 | 11/2009 | Casey |
| 2009/0292884 A1 | 11/2009 | Wang |
| 2009/0314318 A1 | 12/2009 | Chang |
| 2009/0314554 A1 | 12/2009 | Couture |
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0054129 A1 | 3/2010 | Kuik |
| 2010/0063628 A1 | 3/2010 | Landry |
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0161225 A1 | 6/2010 | Hyung |
| 2010/0173070 A1 | 7/2010 | Niu |
| 2010/0206336 A1 | 8/2010 | Souid |
| 2010/0217436 A1 | 8/2010 | Jones |
| 2010/0256812 A1 | 10/2010 | Tsusaka et al. |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0275405 A1 | 11/2010 | Morse |
| 2010/0286791 A1 | 11/2010 | Goldsmith |
| 2010/0305752 A1 | 12/2010 | Abramson |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1 | 4/2011 | Escrig |
| 2011/0088609 A1 | 4/2011 | Vosburgh |
| 2011/0109549 A1 | 5/2011 | Robbins |
| 2011/0125323 A1 | 5/2011 | Gutmann |
| 2011/0131741 A1 | 6/2011 | Jones |
| 2011/0154589 A1 | 6/2011 | Reindle |
| 2011/0202175 A1 | 8/2011 | Romanov |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |
| 2012/0167917 A1 | 7/2012 | Gilbert |
| 2012/0169497 A1 | 7/2012 | Schnittman |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |
| 2012/0192898 A1 | 8/2012 | Lynch |
| 2012/0194395 A1 | 8/2012 | Williams |
| 2012/0194427 A1 | 8/2012 | Lee et al. |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |
| 2012/0219207 A1 | 8/2012 | Shin et al. |
| 2012/0222224 A1 | 9/2012 | Yoon |
| 2012/0246862 A1 | 10/2012 | Landry |
| 2012/0260443 A1 | 10/2012 | Lindgren |

(56) References Cited

U.S. PATENT DOCUMENTS

| | | |
|---|---|---|
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054029 A1 | 2/2013 | Huang |
| 2013/0054129 A1 | 2/2013 | Wong |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1 | 4/2013 | Yoon |
| 2013/0103194 A1 | 4/2013 | Jones |
| 2013/0105233 A1 | 5/2013 | Couture |
| 2013/0117952 A1 | 5/2013 | Schnittman |
| 2013/0118524 A1 | 5/2013 | Konandreas |
| 2013/0138337 A1 | 5/2013 | Pack |
| 2013/0145572 A1 | 6/2013 | Schregardus |
| 2013/0152724 A1 | 6/2013 | Mozeika |
| 2013/0152970 A1 | 6/2013 | Porat |
| 2013/0160226 A1 | 6/2013 | Lee |
| 2013/0166107 A1 | 6/2013 | Robbins |
| 2013/0174371 A1 | 7/2013 | Jones |
| 2013/0198481 A1 | 8/2013 | Gander et al. |
| 2013/0200993 A1 | 8/2013 | Wu et al. |
| 2013/0204463 A1 | 8/2013 | Chiappetta |
| 2013/0204465 A1 | 8/2013 | Phillips |
| 2013/0204483 A1 | 8/2013 | Sung |
| 2013/0205520 A1 | 8/2013 | Kapoor |
| 2013/0206170 A1 | 8/2013 | Svendsen |
| 2013/0206177 A1 | 8/2013 | Burlutskiy |
| 2013/0211589 A1 | 8/2013 | Landry |
| 2013/0214498 A1 | 8/2013 | DeFazio |
| 2013/0226344 A1 | 8/2013 | Wong |
| 2013/0227801 A1 | 9/2013 | Kim |
| 2013/0227812 A1 | 9/2013 | Kim |
| 2013/0228198 A1 | 9/2013 | Hung |
| 2013/0228199 A1 | 9/2013 | Hung |
| 2013/0231779 A1 | 9/2013 | Purkayastha |
| 2013/0231819 A1 | 9/2013 | Hung |
| 2013/0232702 A1 | 9/2013 | Baek |
| 2013/0239870 A1 | 9/2013 | Hudson |
| 2013/0241217 A1 | 9/2013 | Hickey |
| 2013/0253701 A1 | 9/2013 | Halloran |
| 2013/0256042 A1 | 10/2013 | Rudakevych |
| 2013/0268118 A1 | 10/2013 | Grinstead |
| 2013/0269148 A1 | 10/2013 | Chiu |
| 2013/0273252 A1 | 10/2013 | Miyamoto |
| 2013/0298350 A1 | 11/2013 | Schnittman |
| 2013/0310978 A1 | 11/2013 | Ozick |
| 2013/0325178 A1 | 12/2013 | Jones |
| 2013/0331987 A1 | 12/2013 | Karlsson |
| 2013/0331988 A1 | 12/2013 | Goel et al. |
| 2013/0338525 A1 | 12/2013 | Allen |
| 2013/0338828 A1 | 12/2013 | Chiappetta |
| 2013/0338831 A1 | 12/2013 | Noh |
| 2013/0340201 A1* | 12/2013 | Jang ............... A47L 9/009 15/319 |
| 2014/0016469 A1 | 1/2014 | Ho |
| 2014/0026338 A1 | 1/2014 | Kim |
| 2014/0026339 A1 | 1/2014 | Konandreas |
| 2014/0053351 A1 | 2/2014 | Kapoor |
| 2014/0109339 A1 | 4/2014 | Won |
| 2014/0123325 A1 | 5/2014 | Jung |
| 2014/0130272 A1 | 5/2014 | Won |
| 2014/0142757 A1 | 5/2014 | Ziegler |
| 2014/0167931 A1 | 6/2014 | Lee |
| 2014/0180968 A1 | 6/2014 | Song |
| 2014/0266047 A1 | 6/2014 | Hillen et al. |
| 2014/0207280 A1 | 7/2014 | Duffley |
| 2014/0207281 A1 | 7/2014 | Angle |
| 2014/0207282 A1 | 7/2014 | Angle |
| 2014/0238440 A1 | 8/2014 | Dayton |
| 2014/0249671 A1 | 9/2014 | Halloran |
| 2014/0283326 A1 | 9/2014 | Song |
| 2015/0005937 A1 | 1/2015 | Ponulak |
| 2015/0032259 A1 | 1/2015 | Kim |
| 2015/0039127 A1 | 2/2015 | Matsumoto |
| 2015/0057800 A1 | 2/2015 | Cohen |
| 2015/0120056 A1* | 4/2015 | Noh ................ G05D 1/024 700/259 |
| 2015/0185322 A1* | 7/2015 | Haegermarck ...... G05D 1/0248 700/259 |
| 2015/0197012 A1 | 7/2015 | Schnittman |
| 2015/0206015 A1 | 7/2015 | Ramalingam |
| 2015/0265122 A1 | 9/2015 | Han |
| 2015/0367512 A1 | 12/2015 | Hong et al. |
| 2016/0007817 A1 | 1/2016 | Schlischka |
| 2016/0008982 A1 | 1/2016 | Artes et al. |
| 2016/0103451 A1* | 4/2016 | Vicenti ............... A47L 11/4066 700/259 |
| 2016/0144511 A1* | 5/2016 | Romanov ............ G05D 1/0253 701/28 |
| 2016/0167226 A1* | 6/2016 | Schnittman .......... G05D 1/0274 382/153 |
| 2016/0202703 A1 | 7/2016 | Matsubara |
| 2016/0235270 A1* | 8/2016 | Santini ................. A47L 9/0411 |
| 2016/0306359 A1 | 10/2016 | Lindhe |
| 2016/0316982 A1 | 11/2016 | Kim |
| 2017/0273521 A1 | 9/2017 | Klintemyr |
| 2017/0273524 A1 | 9/2017 | Klintemyr |
| 2017/0296021 A1 | 10/2017 | Li et al. |
| 2017/0344019 A1* | 11/2017 | Haegermarck ......... G06T 7/521 |
| 2018/0088583 A1* | 3/2018 | Wang ..................... B25J 11/009 |
| 2018/0103812 A1 | 4/2018 | Lee |
| 2019/0086933 A1* | 3/2019 | Munich .................. B25J 19/005 |

FOREIGN PATENT DOCUMENTS

| | | | | |
|---|---|---|---|---|
| CN | 1668238 | | 9/2005 | |
| CN | 1985738 A | | 6/2007 | |
| CN | 101161174 | | 4/2008 | |
| CN | 101297267 | | 10/2008 | |
| CN | 102046059 A | | 5/2011 | |
| CN | 102083352 | | 6/2011 | |
| CN | 102949144 A | | 3/2013 | |
| CN | 103027634 | | 4/2013 | |
| CN | 103054516 | | 4/2013 | |
| CN | 103491838 | | 1/2014 | |
| CN | 103505155 A | * | 1/2014 | ............ A47L 9/009 |
| CN | 103505155 A | | 1/2014 | |
| CN | 103565373 | | 2/2014 | |
| CN | 103948354 A | | 7/2014 | |
| CN | 104302453 A | | 1/2015 | |
| CN | 105326442 A | | 2/2016 | |
| CN | 205091616 U | | 3/2016 | |
| CN | 105982611 A | | 10/2016 | |
| CN | 103505155 B | * | 11/2016 | ............ A47L 9/009 |
| DE | 3536907 | | 4/1986 | |
| DE | 9307500 | | 7/1993 | |
| DE | 4211789 | | 10/1993 | |
| DE | 4340367 | | 6/1995 | |
| DE | 4439427 | | 5/1996 | |
| DE | 19849978 | | 5/2000 | |
| DE | 202008017137 | | 3/2009 | |
| DE | 102010000174 | | 7/2011 | |
| DE | 102010000573 | | 9/2011 | |

(56) References Cited

FOREIGN PATENT DOCUMENTS

| | | |
|---|---|---|
| DE | 102010037672 | 3/2012 |
| EP | 0142594 | 5/1985 |
| EP | 0358628 | 3/1990 |
| EP | 0474542 | 3/1992 |
| EP | 0569984 | 11/1993 |
| EP | 0606173 | 7/1994 |
| EP | 1099143 | 11/2003 |
| EP | 1360922 | 11/2003 |
| EP | 1441271 | 7/2004 |
| EP | 1331537 | 8/2005 |
| EP | 2050380 | 4/2009 |
| EP | 1969438 | 9/2009 |
| EP | 1395888 | 5/2011 |
| EP | 2316322 | 5/2011 |
| EP | 2322071 A1 | 5/2011 |
| EP | 2296005 | 6/2011 |
| EP | 2251757 | 11/2011 |
| EP | 2417894 | 2/2012 |
| EP | 2438843 | 4/2012 |
| EP | 2466411 | 6/2012 |
| EP | 2561787 | 2/2013 |
| EP | 2578125 | 4/2013 |
| EP | 2583609 | 4/2013 |
| EP | 2604163 | 6/2013 |
| EP | 2624177 A1 | 8/2013 |
| EP | 2679130 A1 * | 1/2014 ............. A47L 9/009 |
| EP | 2447800 | 4/2014 |
| EP | 2741483 | 6/2014 |
| EP | 2772815 | 9/2014 |
| EP | 2992803 | 3/2016 |
| FR | 2999410 | 6/2014 |
| GB | 1447943 | 9/1976 |
| GB | 2355523 | 4/2001 |
| GB | 2382251 | 5/2003 |
| GB | 2494446 | 3/2013 |
| GB | 2884364 | 6/2015 |
| JP | 5540959 | 3/1980 |
| JP | 6286414 | 4/1987 |
| JP | 62109528 | 5/1987 |
| JP | 62120510 | 6/1987 |
| JP | 62152421 | 7/1987 |
| JP | 62152424 | 7/1987 |
| JP | 63127310 | 5/1988 |
| JP | 63181727 | 7/1988 |
| JP | 63241610 | 10/1988 |
| JP | 03162814 | 7/1991 |
| JP | 03166074 | 7/1991 |
| JP | 04260905 | 9/1992 |
| JP | 0584200 | 4/1993 |
| JP | 0584210 | 4/1993 |
| JP | 05084200 | 4/1993 |
| JP | 05184489 A | 7/1993 |
| JP | 05189041 | 7/1993 |
| JP | 05224745 | 9/1993 |
| JP | 05228090 | 9/1993 |
| JP | 064133 | 1/1994 |
| JP | 0643935 A | 2/1994 |
| JP | 0683442 | 3/1994 |
| JP | 06125861 | 5/1994 |
| JP | 06144215 | 5/1994 |
| JP | 06179145 | 6/1994 |
| JP | 075922 | 1/1995 |
| JP | 0759695 | 3/1995 |
| JP | 0732752 | 4/1995 |
| JP | 07129239 | 5/1995 |
| JP | 07281742 | 10/1995 |
| JP | 08089455 | 4/1996 |
| JP | 08286746 A | 11/1996 |
| JP | 08326025 | 12/1996 |
| JP | 0944240 | 2/1997 |
| JP | 09150741 | 6/1997 |
| JP | 09185410 | 7/1997 |
| JP | 11267074 | 10/1999 |
| JP | 2001022443 | 1/2001 |
| JP | 2001187009 | 7/2001 |
| JP | 2002182742 | 6/2002 |
| JP | 2002287824 | 10/2002 |
| JP | 2002355204 | 12/2002 |
| JP | 2002366228 | 12/2002 |
| JP | 2003116758 A | 4/2003 |
| JP | 2003280740 | 10/2003 |
| JP | 2004096253 | 3/2004 |
| JP | 2004166968 | 6/2004 |
| JP | 2004198212 | 7/2004 |
| JP | 2004303134 | 10/2004 |
| JP | 200540597 | 2/2005 |
| JP | 2005124753 | 5/2005 |
| JP | 2005141636 | 6/2005 |
| JP | 2005314116 | 11/2005 |
| JP | 2006015113 | 1/2006 |
| JP | 2006087507 | 4/2006 |
| JP | 2006231477 | 9/2006 |
| JP | 2006314669 | 11/2006 |
| JP | 2007014369 | 1/2007 |
| JP | 2007070658 | 3/2007 |
| JP | 2007143645 | 6/2007 |
| JP | 2006185438 | 7/2007 |
| JP | 2007213236 | 8/2007 |
| JP | 2007226322 | 9/2007 |
| JP | 2007272665 | 10/2007 |
| JP | 2008132299 | 6/2008 |
| JP | 2008146617 | 6/2008 |
| JP | 2008290184 | 12/2008 |
| JP | 2008543394 | 12/2008 |
| JP | 2009500741 | 1/2009 |
| JP | 2009509220 | 3/2009 |
| JP | 2009193240 | 8/2009 |
| JP | 2010507169 | 3/2010 |
| JP | 201079869 | 4/2010 |
| JP | 2010526594 | 8/2010 |
| JP | 2010534825 | 11/2010 |
| JP | 2011045694 | 3/2011 |
| JP | 2011133405 A | 7/2011 |
| JP | 2011253361 | 12/2011 |
| JP | 2012216051 | 11/2012 |
| JP | 2013041506 | 2/2013 |
| JP | 201389256 | 5/2013 |
| JP | 2013089256 | 5/2013 |
| JP | 2013247986 | 12/2013 |
| JP | 2014023930 | 2/2014 |
| JP | 2014048842 A | 3/2014 |
| JP | 2015521760 A | 7/2015 |
| JP | 2015534048 A | 11/2015 |
| KR | 20040096253 | 11/2004 |
| KR | 20050003112 | 1/2005 |
| KR | 20070070658 | 7/2007 |
| KR | 20090028359 | 3/2009 |
| KR | 20130002218 A | 1/2013 |
| KR | 101231932 | 3/2013 |
| KR | 101338143 B1 | 12/2013 |
| KR | 201501240011 A | 11/2015 |
| KR | 101613467 B1 | 4/2016 |
| KR | 101650128 B1 | 8/2016 |
| NL | 7408667 | 1/1975 |
| WO | 8804081 | 6/1988 |
| WO | 9303399 | 2/1993 |
| WO | 9638770 | 12/1996 |
| WO | 0036961 | 6/2000 |
| WO | 0036970 | 6/2000 |
| WO | 0038025 | 6/2000 |
| WO | 0182766 | 11/2001 |
| WO | 03022120 | 3/2003 |
| WO | 03024292 | 3/2003 |
| WO | 03026474 A2 | 4/2003 |
| WO | 2004006034 | 1/2004 |
| WO | 2004082899 | 9/2004 |
| WO | 2007008148 | 1/2007 |
| WO | 2007028049 | 3/2007 |
| WO | 2007051972 | 5/2007 |
| WO | 2007065034 | 6/2007 |
| WO | 2008048260 | 4/2008 |
| WO | 2009132317 | 10/2009 |
| WO | 2011003667 A1 | 1/2011 |
| WO | 2012008702 A2 | 1/2012 |

(56) References Cited

FOREIGN PATENT DOCUMENTS

| WO | 2013105431 | | 7/2013 | |
|---|---|---|---|---|
| WO | 2013157324 | | 10/2013 | |
| WO | 2014033055 | | 3/2014 | |
| WO | 2015016580 | | 2/2015 | |
| WO | 2016005011 | A1 | 1/2016 | |
| WO | 2016130188 | A1 | 8/2016 | |
| WO | WO-2016130188 | A1 * | 8/2016 | ............ A47L 9/0411 |

OTHER PUBLICATIONS

Evaluating the Roomba: A low-cost, ubiquitous platform for robotics research and education; Ben Tribelhorn;Zachary Dodds; Proceedings 2007 IEEE International Conference on Robotics and Automation; IEEE Conference Paper; (Year: 2007).*
Mobility enhancement design and control for a Dual-Wheel Dual-Armed Mobile Manipulator; Hongtai Cheng;Guangfei Ji;Chungang Du; 2015 IEEE International Conference on Robotics and Biomimetics (ROBIO); IEEE Conference Paper; (Year: 2015).*
Zuo et al., "A Reinforcement Learning Based Robotic Navigation System," 2014 IEEE International Conference on Systems, Man, and Cybernetics, Oct. 5-8, 2014, San Diego, CA, USA, 6 pages. (Year: 2014).*
Bagnell et al., "Learning for Autonomous Navigation," IEEE Robotics & Automation Magazine, Jun. 2010, 11 pages. (Year: 2010).*
Ellis et al., "Autonomous Navigation and Sign Detector Learning," 2013 IEEE Workshop on Robot Vision (WORV), Jan. 15-17, 2013, 8 pages. (Year: 2013).*
Pontil et al. "Support Vector Machines for 3D Object Recognition," IEEE Transactions on Pattern Analysis and Machine Intelligence, Jun. 1998, 20(6):637-646. (Year: 1998).*
USPTO Notice of Allowance issued in U.S. Appl. No. 15/534,327, dated Aug. 13, 2020, 5 pages.
USPTO Final Office Action issued in U.S. Appl. No. 15/565,467, dated Jun. 2, 2020, 8 pages.
Chinese Office Action issued in Chinese Application No. 2016800855242, dated Jul. 3, 2020, 15 pages.
Chinese Office Action issued in Chinese Application No. 2014800837122, dated Jul. 17, 2020 with translation, 18 pages.
Chinese Office Action issued in Chinese Patent Application No. 201780090566X, dated Feb. 1, 2021, 11 pages.
Chinese Office Action issued in Chinese Patent Application No. 2017800875876, dated Jan. 6, 2021, 12 pages.
Chinese Office Action issued in Chinese Application No. 2016800855242, dated May 25, 2021 with translation, 23 pages.
USPTO Notice of Allowance issued in U.S. Appl. No. 15/565,467, dated Sep. 22, 2020, 6 pages.
Chinese Office Action for Chinese Application No. 2014800837122, dated May 5, 2019 with translation, 20 pages.
Japanese Notice of Reasons for Refusal issued in Japanese Application No. 2019-542478, dated Mar. 16, 2021 with translation, 5 pages.
Japanese Notice of Reasons for Refusal issued in Japanese Application No. 2019-557633, dated Mar. 18, 2021 with translation, 9 pages.
Non Final Office Action for U.S. Appl. No. 15/534,237, dated Mar. 7, 2019, 11 pages.
Notice of Reasons for Refusal for Japanese Application No. 2018-537617, dated Feb. 28, 2020, 3 pages.
Chinese Office Action for Chinese Application No. 2015800781846, dated Mar. 24, 2020, 9 pages.
"SM51 Series Opposed Mode Sensors, DC sensors with metal housings: SM51EB/RB, SM51EB6/RB6", Banner Engineering Corporation, pp. 1-24.
Andersson, et al., "ISR: An Intelligent Service Robot", Centre for Autonomous Systems, Royal Institute of Technology, S-100 44 Stockholm, Sweden, pp. 1-24.
Berlin, et al. "Development of a Multipurpose Mobile Robot for Concrete Surface Processing", A Status Report, Feb. 1992, Sweden, pp. 1-10.
Borenstein, et al. "Real-Time Obstacle Avoidance for Fast Mobile Robots", IEEE, Jan. 6, 1996, pp. 1-18.
Braunstingl, et al., "Fuzzy Logic Wall Following of a Mobile Robot Based on the Concept of General Perception", ICAR '95, 7th International Conference on Advanced Robotics, Sant Feliu De Guixols, Spain pp. 367-376., Sep. 1995, pp. 1-9.
Caselli, et al. "Mobile Robot Navigation in Enclosed Large-Scale Space", Italy and U.S.A., pp. 1-5.
Cassens, et al. "Finishing and Maintaining Wood Floors", Wood Finishing, North Central Regional Extension Publication #136, pp. 1-8.
Chinese Office Action for Application No. 201380081331.6, dated Mar. 26, 2018 with translation, 27 pages.
Chinese Office Action for Chinese Applciation No. 201380081537.9, dated Jun. 4, 2018 with translation, 15 pages.
Chinese Office Action for Chinese Application No. 20130075510.9, dated Feb. 6, 2017 with translation, 14 pages.
Chinese Office Action for Chinese Application No. 201380075503.9, dated Feb. 13, 2017 with translation, 18 pages.
Chinese Office Action for Chinese Application No. 201380075503.9, dated Nov. 8, 2017 with translation, 16 pages.
Chinese Office Action for Chinese Application No. 201380075510.9, dated Oct. 27, 2017 with translation, 13 pages.
Chinese Office Action for Chinese Application No. 201380081103.9, dated Feb. 27, 2018 withtranslation, 19 pages.
Chinese Office Action for Chinese Application No. 201380081535.X, dated Mar. 26, 2018, 18 pages.
Chung et al.,"Path Planning For A Mobile Robot With Grid Type World Model", Proceedings of the 1992 IEEE/RSJ International Conference on Intelligent Robots and Systems ,Jul. 7-10, 1992, pp. 439-444.
Collins, et al. "Cerebellar Control of a Line Following Robot", Computer Science and Electrical Engineering Department, University of Queensland, St.Lucia, Queensland, 4072 A, pp. 1-6.
Decision for Refusal for Japanese Application No. 2016-526875, dated May 15, 2018 with translation, 6 pages.
Decision of Refusal for Japanese Application No. 2016-526945, dated May 7, 2017 with trasnslation, 5 pages.
Doty, et al. "Sweep Strategies for a Sensory-Driven, Behavior-Based Vacuum Cleaning Agent", 1993, Machine Intelligence Laboratory-Gainesville Florida, AAAI 1993 Fall Symposium Series-Research Triangle Park—Raleigh, NC, Oct. 22-24, 1993, pp. 1-6.
European Communication Pursuant to Article 94(3) for European Application No. 14176479.0, dated Nov. 27, 2017, 6 pages.
European Communication Pursuant to Article 94(3) for EP Application No. 13817911.4, dated Jan. 15, 2014, 8 pages.
Everett, Sensors For Mobile Robots Theory and Application, A.K. Peters, 1995, Chapters 1 and 3, 70 pages.
Everett, Sensors For Mobile Robots Theory and Application, A.K. Peters, Ltd., 1995, Chapters 15 and 16, 59 pages.
Everett, Sensors for Mobile Robots Theory and Application, A.K. Peters, Ltd., 1995, Chapters 6, 7 and 10, 79 pages.
Everett, Sensors For Mobile Robots Theory and Application, A.K. Peters, Ltd., 1995, Chapters, 4and 5, 68 pages.
Everett, et al. "Survey of Collision Avoidance and Ranging Sensors for Mobile Robots", Revision 1, Technical Report 1194, Dec. 1992, pp. 1-154.
Extended European Search Report for European Application No. 16176479.0, dated Nov. 11, 2016, 9 pages.
Extended European Search Report for European Application No. 18157403.9, dated Nov. 14, 2018,12 pages.
Final Office Action for U.S. Appl. No. 14/409,291, dated Jun. 6, 2017, 21 pages.
Final Office Action for U.S. Appl. No. 14/784,106, dated Mar. 28, 2018, 8 pages.
Final Office Action for U.S. Appl. No. 15/100,667, dated Apr. 21, 2017, 26 pages.
Final Office Action for U.S. Appl. No. 15/100,667, dated Mar. 27, 2018, 23 pages.
Final Office Action for U.S. Appl. No. 15/101,212, dated Oct. 11, 2017, 7 pages.
Final Office Action for U.S. Appl. No. 15/102,017, dated Jun. 14, 201812 pages.

(56) References Cited

OTHER PUBLICATIONS

Final Office Action for U.S. Appl. No. 15/101,235, dated Jan. 11, 2018, 12 pages.
Gavrilut, et al., "Wall-Following Method for an Autonomous Mobile Robot using Two IR Sensors", 12th WSEAS International Conference on SYSTEMS, Heraklion, Greece, Jul. 22-24, 2008, ISBN: 978-960-6766-83-1, ISSN: 1790-2769, pp. 205-209.
Gutman et al., AMOS: Comparison of Scan Matching Approaches for Self-Localization in Indoor Environments, 1996, IEEE, pp. 61-67.
Herbst, et al., "Micromouse Design Specifications", Jun. 2, 1998, pp. 1-22.
International Preliminary Report on Patentability for International Application No. PCT/EP2013/077377, dated Jun. 21, 2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report on Patentability for International Application No. PCT/EP2013/077657, dated Jun. 21, 2016, 7 pages.
International Preliminary Report on Patentability for International Application No. PCT/EP2013/077661, dated Jun. 21, 2016, 11 pages.
International Preliminary Report on Patentability for International Application No. PCT/EP203/077380, dated Jun. 21, 2016, 6 pages.
International Search Report and Written Opinion for the International Searching For International Application No. PCT/EP2016/055547, dated Jan. 2, 2017, 10 pages.
International Search Report and Written Opinion of the International Searching Authoirty for International Application No. PCT/EP2015/040140, dated May 27, 2016, 11 pages.
International Search Report and Written Opinion of the International Searching Authority for *International Application No. PCT/EP2015/058377, dated Aug. 10, 2016, 15 pages.
International Search Report and Written Opinion of the International Searching Authority for International Application No. PCT/EP2014/069073, dated May 12, 2015, 10 pages.
International Search Report and Written Opinion of the International Searching Authority for International Application No. PCT/EP2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No. PCT/EP2013/077380, dated Jul. 28, 2014, 8 pages.
International Search Report and Written Opinion of the International Searching Authority for International Application No. PCT/EP2013/077384, dated Aug. 14, 2016, 9 pages.
International Search Report and Written Opinion of the International Searching Authority for International Application No. PCT/EP2013/077385, dated May 27, 2015, 9 pages.
International Search Report and Written Opinion of the International Searching Authority for International Application No. PCT/EP2013/077386, dated Sep. 17, 2014, 9 pages.
International Search Report and Written Opinion of the International Searching Authority for International Application No. PCT/EP2013/077387, dated Sep. 30, 2014, 12 pages.
International Search Report and Written Opinion of the International Searching Authority for International Application No. PCT/EP2013/077661, dated Jun. 10, 2014, 15 pages.
International Search Report and Written Opinion of the International Searching Authority for International Application No. PCT/EP2014/069074, dated May 11, 2015, 9 pages.
International Search Report and Written Opinion of the International Searching Authority for International Application No. PCT/EP2014/077549, dated Jul. 27, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 19pages.
International Search Report and Written Opinion of the International Searching Authority for International Application No. PCT/EP2014/078144, 7 pages.
International Search Report and Written Opinion of the International Searching Authority for International Application No. PCT/EP2016/060565, dated Feb. 15, 2017, 12 pages.
International Search Report and Written Opinion of the International Searching Authority for International Application No. PCT/EP2016/060571, dated Feb. 7, 2017, 8 pages.
International Search Report and Written Opinion of the International Searching Authority for International Application No. PCT/EP32013/077657, dated Aug. 18, 2014, 10 pages.
International Search Report and Written Opinion of the International Searching Authority for Internatonal Applicaion No. PCT/EP2014/0077142, dated Sep. 11, 2015, 8 pages.
International Search Report for International Application No. PCT/EP2013/057814 dated Dec. 20, 2013, 5pages.
International Search Report for International Application No. PCT/EP2013/057815 dated Apr. 12, 2014, 4 pages.
International Search Report for International Application No. PCT/EP2013/067500 dated Dec. 10, 2013, 4 pages.
Japanese Office Action for Application for Japanese Application No. 2015-528969, dated Apr. 7, 2017 with translation, 4 pages.
Japanese Office Action for Japanese Application No. 2016-506794, dated Feb. 7, 2017 with translation, 10 pages.
Japanese Office Action for Japanese Application No. 2016-506795, dated Feb. 7, 2017 with translation, 6 pages.
Jenkins, "Practical Requirements for a Domestic Vacuum-Cleaning Robot", From: AAAI Technical Report FS-93-03., JRL Consulting, Menlo Park, California, pp. 85-90.
Jones et al., Mobile Robots Inspiration to Implementation, Second Edition, A.K. Peters, Ltd., 1999, Chapters 1 and 5, 72pages.
Jones etal., Mobile Robots Inspiration to Implementation, Second Edition, A.K. Peters ,Ltd., 1999, Chapters 6 and 9, 56pages.
Jones et al., Mobile Robots Inspiration to Implementation, Second Edition, A.K. Peters, Ltd., 1999, Chapters 10 and 11, 45pages.
Jung, et al. "Whisker Based Mobile Robot Navigation", Wollongong, NSW 2500, Australia, pp. 1-8.
Krishna, et al., "Solving the Local Minima Problem for a Mobile Robot by Classification of Spatio-Temporal Sensory Sequences", Journal of Robotic Systems 17 (10), 2000, pp. 549-564.
Kube, "A Minimal Infrared Obstacle Detection Scheme", Department of Computing Science, University of Alberta, Edmonton, Alberta, Canada, The Robotics Practitioner, 2(2): 15-20,1996, Oct. 23, 1998, pp. 1-8.
Larson, "RoboKent—a case study in man-machine interfaces" Industrial Robot, vol. 25 No. 2, 1998, pp. 95-100.
LeBouthillier, "W. Grey Walter and his Turtle Robots", The Robot Builder, vol. 11 No. 5, May 1999, RSSC POB 26044, Santa Ana,CA, pp. 1-8.
Maaref, et al."Sensor-based navigation of a mobile robot in an indoor environment", Robotics and Autonomous Systems, 2002, Elsevier, 18pages.
Michael Carsten Bosse, "Atlas: A Framework for Large Scale Automated Mapping and Localization", Massachusetts Institute of Technology, Feb. 2004, Part 2, 67 pages.
Michael Carsten Bosse, "Atlas: A Framework for Large Scale Automated Mapping and Localization", Massachusetts Institute of Technology, Feb. 2004, Part 1, 140 pages.
Non Final Office Action for U.S. Appl. No. 14/409,291, dated Dec. 28, 2016, 61 pages.

(56) References Cited

OTHER PUBLICATIONS

Non Final Office Action for U.S. Appl. No. 13/504,066, dated Nov. 5, 2018, 18 pages.
Non Final Office Action for U.S. Appl. No. 15/101,235, dated Nov. 1, 2017, 11 pages.
Non Final Office Action for U.S. Appl. No. 14/784,106, dated Oct. 19, 2017, 11 pages.
Non Final OFfice Action for U.S. Appl. No. 14/784,110, dated Aug. 16, 2018, 13 pages.
Non Final Office Action for U.S. Appl. No. 15/100,667, dated Nov. 29, 2017, 22 pages.
Non Final Office Action for U.S. Appl. No. 15/100,667, dated Sep. 12, 2016, 24 pages.
Non Final Office Action for U.S. Appl. No. 15/101,212, dated May 17, 2017, 8 pages.
Non Final Office Action for U.S. Appl. No. 15/101,235 dated Apr. 21, 2017, 10 pages.
Non Final Office Action for U.S. Appl. No. 15/101,257, dated Feb. 10, 2017, 10 pages.
Non Final Office Action for U.S. Appl. No. 15/101,510, dated Jul. 27, 2018, 17 pages.
Non Final Office Action for U.S. Appl. No. 15/101,515, dated Apr. 18, 2018, 14 pages.
Non Final Office Action for U.S. Appl. No. 15/102,015, dated Aug. 17, 2017, 13 pages.
Non Final Office Action for U.S. Appl. No. 15/102,017, dated Feb. 16, 2018, 12 pages.
Non Final Office Action for U.S. Appl. No. 15/102,017, dated Jan. 22, 2019, 15 pages.
Non Final Office Action for U.S. Appl. No. 15/504,071, dated Nov. 2, 2018, 17 pages.
Non Final Office Action for U.S. Appl. No. 15/101,235, dated Jun. 14, 2018, 11 pages.
Non Final Office Action for U.S. Appl. No. 15/321,333, dated Oct. 24, 2018, 10 pages.
Notice of Allowance for U.S. Appl. No. 15/100,667, dated Aug. 6, 2018, 22 pages.
Notice of Allowance for U.S. Appl. No. 14/409,291, dated Jun. 16, 2016, 13 pages.
Notice of Allowance for U.S. Appl. No. 14/409,291, dated Sep. 18, 2017, 8 pages.
Notice of Allowance for U.S. Appl. No. 14/784,106, dated Oct. 11, 2018, 7 pages.
Notice of Allowance for U.S. Appl. No. 15/101,2121 dated Apr. 11, 2018, 9 pages.
Notice of Allowance for U.S. Appl. No. 15/101,257, dated Jul. 6, 2017, 9 pages.
Notice of Allowance for U.S. Appl. No. 15/101,515, dated Aug. 28, 2018, 11 pages.
Notice of Allowance for U.S. Appl. No. 15/102,015, dated Dec. 11, 2017, 8 pages.
Notice of Allowance for U.S. Appl. No. 15/102,295, dated Sep. 24, 2018, 9 pages.
Notice of Reasons for Rejection for Japanese Application No. 2016-526756, dated Aug. 10, 2017, with translation, 6 pages.
Notice of Reasons for Rejection for Japanese Application No. 2016-526759, dated Aug. 24, 2017 with translation, 9 pages.
Notice of Reasons for Rejection for Japanese Application No. 2016-526765, dated Aug. 25, 2017 with translation, 7 pages.
Notice of Reasons for Rejection of Japanese Application No. 2016-526764, dated Aug. 25, 2017 with translation. 6 pages.
Notification fo Reasons for Refusal for Japanese Application No. 2016-526875, dated Oct. 31, 2017 with translation, 10 pages.
Notification of Reasons for Refusal for Japanese Application No. 2016-526765, dated May 15, 2018 with translation, 6 pages.
Notification of Reasons for Refusal for Japanese Application No. 2016-526945, dated Oct. 31, 2017 with translation, 8 pages.
Notification of Reasons for Refusal for Japanese application No. 2016-568949, dated Oct. 9, 2018 with translation, 6 pages.
Notification of Reasons for Refusal for Japanese Application No. 2017-501374, dated Mar. 6, 2016 with translation, 8 pages.
Notification of Reasons for Rejection for Japanese Application No. 2016-526947, dated Sep. 21, 2017 with translation,, 8 pages.
Oren, Reply to Office Action dated Jun. 23, 2014, U.S. Appl. No. 13/757,985, pp. 1-10.
Pack, et al., "Constructing a Wall-Follower Robot for a Senior Design Project", 1996 ASEE Annual Conference Proceedings, Session 1532, pp. 1-7.
Position_Definition of Position by Merriam-Webster.pdf (Position | Definition of Position by Merriam-Webster, Oct. 16, 2016, Merriam-Webster, https://www.merriam-webster.com/dictinary/position, pp. 1-15).
Report of Reconsideration for Japanese Application No. 2016-011556, dated Oct. 24, 2018, 2 pages.
Saffiotti, "Fuzzy logic in Autonomous Robot Navigation", a case study, Nov. 1995 Revised: Aug. 1997, IRIDIA, Universite Libre de Bruxelles, Belgium, , Technical Report TR/IRIDIA/ 95 25, Cover page + pp. 1-14.
Written Opinion for International Application No. PCT/EP2013/067500 dated Dec. 10, 2013, 7 pages.
Yamamoto, "SOZZY: A Hormone-Driven Autonomous Vacuum Cleaner", From: AAAI Technical Report FS-93-03, Matasushita Research Institute, Tokyo, and MIT Artificial Intelligence laboratory, Massachusetts, pp. 116-124 + Figure 9 and Figure 11.
USPTO Non Final Office Action Issued in U.S. Appl. No. 16/491,355, dated Apr. 16, 2021, 14 pages.
Final Office Action for U.S. Appl. No. 15/534,327, dated Jul. 26, 2019, 16 pages.
Korean Office Action issued in Korean Patent Application No. 10-2019-7025893, dated Apr. 28, 2021, 10 pages.
Chinese Office Action for Chinese Application No. 2015800781846, dated Sep. 18, 2019 with translation, 15 pages.
International Search Report and Written Opinion of the International Searching Authority for International Application No. PCT/E2016/072291, dated Jun. 6, 2017, 11 pages.
Final Office Action for U.S. Appl. No. 15/101,510, dated Feb. 8, 2019, 16 pages.
Non Final Office Action for U.S. Appl. No. 15/565,467, dated Jan. 29, 2020, 12 pages.
Chinese Office Action for Chinese Application No. 2014800837122, dated Jan. 7, 2020, 10 pages.
Notification of Reasons for Refusal for Japanese Application No. 2017-544589, dated Apr. 2, 2019 with translation, 6 pages.
International Search Report and Written Opinion for International Application No. PCT/EP2017/056100, dated Dec. 18, 2017, 9 pages.
International Preliminary Report on Patentability for International Application No. PCT/EP2017/056100, dated Sep. 17, 2019, 6 pages.
International Search Report and Written Opinion for International Application No. PCT/EP2017/063468, dated Mar. 1, 2018, 10 pages.
Korean Office Action for Korean Application No. 10-2019-7034477, dated Aug. 23, 2021 with translation, 14 pages.

\* cited by examiner

ROBOTIC CLEANING DEVICE AND A METHOD AT THE ROBOTIC CLEANING DEVICE OF PERFORMING CLIFF DETECTION

This application is a U.S. National Phase application of PCT International Application No. PCT/EP2016/055547, filed Mar. 15, 2016, which is incorporated by reference herein.

TECHNICAL FIELD

The invention relates to a robotic cleaning device and a method at the robotic cleaning device of performing cliff detection along a surface over which the robotic cleaning device moves.

BACKGROUND

In many fields of technology, it is desirable to use robots with an autonomous behaviour such that they freely can move around a space without colliding with possible obstacles.

Robotic vacuum cleaners are known in the art, which are equipped with drive means in the form of a motor for moving the cleaner across a surface to be cleaned. The robotic vacuum cleaners are further equipped with intelligence in the form of microprocessor(s) and navigation means for causing an autonomous behaviour such that the robotic vacuum cleaners freely can move around and clean a surface in the form of e.g. a floor. Thus, these prior art robotic vacuum cleaners have the capability of more or less autonomously vacuum clean a room in which objects such as tables and chairs and other obstacles such as walls and stairs are located.

A particularly problematic obstacle encountered is a cliff, typically in the form of a stair leading down to a lower floor. If such a cliff is not detected by the robotic cleaner, there is a risk that the robot drops off a ledge, falls down the cliff and becomes permanently damaged.

WO 02/101477 discloses a robotic cleaner for performing autonomous cleaning of a surface. The robotic cleaner is equipped with reflective infrared (IR) proximity cliff sensors arranged at an underside of the robot and directed to observe the floor over which the robot moves. These cliff sensors emit IR beams and detect IR beams reflected from the surface over which the robot moves and upon encountering a cliff, no IR beam is reflected and the robot deducts that a cliff has been encountered.

However, a problem with this approach is that the robot detects the cliff as it is encountered, which renders it difficult for the robot to plan a cleaning path in advance to be followed for effectively cleaning the surface.

SUMMARY

An object of the present invention is to solve, or at least mitigate, this problem in the art and to provide an improved method at a robotic cleaning device of performing cliff detection.

This object is attained in a first aspect of the present invention by a method for a robotic cleaning device of performing cliff detection along a surface over which the robotic cleaning device moves. The method comprises illuminating the surface with at least one light source, capturing an image of the surface, detecting at least one illuminated section in the captured image, and determining distance to objects in the at least one illuminated section of the captured image. Further the method comprises comparing at least two of the determined distances and detecting an object in the captured image as a cliff when a relation between the at least two compared determined distances complies with a predetermined increase criterion.

This object is attained in a second aspect of the present invention by a robotic cleaning device comprising, a propulsion system arranged to move the robotic cleaning device over a surface to be cleaned, at least one light source arranged to illuminate the surface, a camera device arranged to capture an image of the surface, and a controller configured to control the propulsion system to move the robotic cleaning device and to control the camera device to capture the image. The controller is further configured to detect at least one illuminated section in the captured image, determine distance to objects in the at least one illuminated section of the captured image, compare at least two of the determined distances; and to detect an object in the captured image as a cliff when a relation between the at least two compared determined distances complies with a predetermined increase criterion.

Hence, the robotic cleaning device uses a light source illuminating the surface over which it moves while capturing images of the illuminated surface with its camera. By detecting illuminated objects captured in the images, it is possible for the robotic cleaning device to autonomously travel around the surface for performing a cleaning operation.

Now, upon encountering, e.g., a doorway where a stair leads down to a lower floor, a part of the light of the light source will fall onto the floor and ledge indicating the downwards-leading stair, while another part of the light falling beyond the ledge will impinge on for instance a wall of a stairwell leading down to the lower floor. This will cause a discontinuity in an illuminated section of the captured image (corresponding to the illuminated surface).

By having the robotic cleaning device determine distances to objects being illuminated in the captured image, it may be determined whether a distance from one detected object to another unexpectedly increases. Since the illuminated section (in which the objects are detected) of the captured image is discontinued at the ledge indicating the stair, the distance from the robotic cleaning device to an object residing beyond the ledge—e.g. the stairwell wall—will radically increase as compared to a preceding object located at or close to the ledge—e.g. the floor.

By comparing the distances and concluding that a relation between the at least two compared determined distances complies with a predetermined increase criterion stipulating that the increase in distance to the object beyond the ledge is sufficiently great with respect to the distance to the object located at the ledge, it can advantageously be concluded that a cliff has been detected.

Advantageously, this cliff is detected long before the robotic device encounters the ledge.

In an embodiment, when comparing two or more distances, for instance a first distance $d_3$ with a second distance $d_4$, a predetermined threshold value T may be utilized to determine whether the increase in distance is sufficiently great. Thus, the increase is considered sufficiently great when a relation between the at least two compared determined distances $d_4$, $d_3$ complies with the predetermined increase criterion.

In a further embodiment, the predetermined increase criterion is that a difference between the at least two compared determined distances exceeds a predetermined threshold value. For example, it may be determined whether $\Delta_d = d4-d3 \geq T$, where the threshold value T is appropriately selected. If so, the increase in distance is to be considered sufficiently great, and thus that a cliff advantageously has been detected.

In an alternative embodiment, it may be determined whether $d4/d3 \geq T$ for concluding that the increase in distance is sufficiently great. In yet an alternative, it may be determined whether $d3/d4 \leq T$. Other alternatives of determining whether the increase $\Delta_d$ in distance is sufficiently great can be envisaged.

In another embodiment, a representation of surroundings of the robotic cleaning device is created from detected objects of the captured image, and an indication of the detected cliff is added to the created representation.

To this end, a controller derives positional data of the robotic cleaning device with respect to the surface to be cleaned from the detected objects of the recorded images and the associated determined distances, generates a 3D representation of the surroundings from the derived positional data and controls the robotic cleaning device to move across the surface to be cleaned in accordance with the generated 3D representation and navigation information supplied to the robotic cleaning device such that the surface to be cleaned can be autonomously navigated by taking into account the generated 3D representation.

The 3D representation generated from the images recorded by the camera thus facilitates detection of obstacles in the form of walls, floor lamps, table legs, around which the robotic cleaning device must navigate as well as rugs, carpets, doorsteps, etc., that the robotic cleaning device must traverse. The robotic cleaning device is hence configured to learn about its environment or surroundings by operating/cleaning.

The robotic cleaning device will in this embodiment advantageously add an indication of detected cliff(s) to the created representation of its surroundings.

In still another embodiment, the robotic cleaning device plans a cleaning path to be traversed by taking into account the detected cliff.

Thus, by adding to the created representation an indication of the cliff, it is advantageously possible for the robotic cleaning device to plan a cleaning path to be traversed well in advance and further to move very close to, and along, a ledge of the cliff since it is included in the representation of the surroundings of the robotic cleaning device.

Further in contrast to prior art cliff detectors, which detect a cliff just shortly before approaching the cliff and therefore needs to move at an amble pace to reduce the risk of falling down the cliff, the invention advantageously facilitates approaching a cliff at a relatively high speed, since the robotic cleaning device knows in advance exactly where the cliff is located and adds, to the created representation, and indication thereof accordingly.

In yet another embodiment, when detecting at least one illuminated section in the captured image, the robotic cleaning device further detects that a discontinuity occurs in the illuminated section of the captured image, where the illuminated section ceases to occur in the image beyond the detected discontinuity. Further in this embodiment, upon determining distance to objects in the illuminated section of the captured image, a value is assigned to a distance being determined before the discontinuity such that the assigned value reflects a sufficiently great increase.

Hence, it may be envisaged, depending on how the laser beam falls into the above exemplified stairwell, that the illuminated section beyond the ledge of the stairwell will not be present at all in the image. This indicates that a cliff is present, and this embodiment will advantageously detect the cliff.

Preferred embodiment of the present invention will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The invention relates to robotic cleaning devices, or in other words, to automatic, self-propelled machines for cleaning a surface, e.g. a robotic vacuum cleaner, a robotic sweeper or a robotic floor washer. The robotic cleaning device according to the invention can be mains-operated and have a cord, be battery-operated or use any other kind of suitable energy source, for example solar energy.

Figure 1:
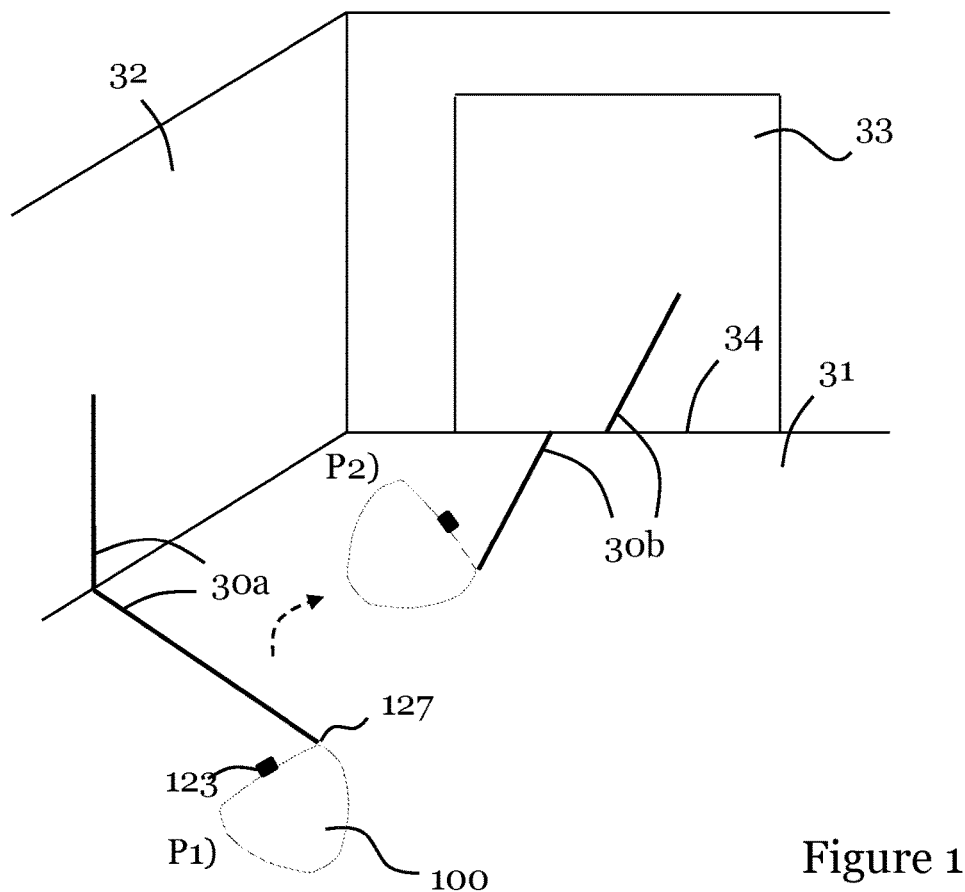
FIG. 1 illustrates detection of objects on a surface over which the robotic cleaning device moves in accordance with an embodiment of the present invention.

FIG. 1 illustrates detection of objects on a surface over which the robotic cleaning device moves in accordance with an embodiment of the present invention.

In this particular exemplifying embodiment, the robotic device too uses one vertical line laser 127 for illuminating the surface (i.e. floor 31) over which it moves. However, any appropriate light source may be envisaged for illuminating the surface 31. Further, a smaller or greater part of the surface may be illuminated.

As can be seen in FIG. 1, the line laser 127 projects a laser beam 30a onto the floor 31 and a first wall 32 of a room to be cleaned, while the robotic device 100 uses its camera 123 to capture images of the illuminated surface.

Figure 2A:
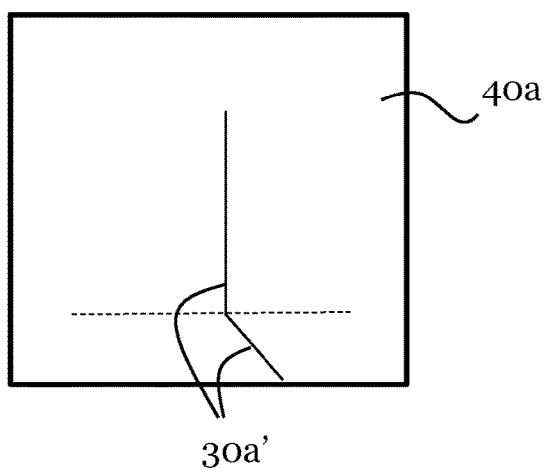
FIG. 2a illustrates an image captured by the camera of the robotic device when in position P1 of FIG. 1 according to an embodiment.

FIG. 2a illustrates an image 40a captured by the camera 123 of the robotic device 100 when in position P1.

As can be seen, the laser beam 30a will fall onto the floor 31 and the wall 32 and cause corresponding illuminated section 30a' to be present in the image. The location in the image 40a where the floor 31 meets the wall 32 is indicated with a dashed line only for illustrational purposes; the dashed line is not present in the captured image 40a. From the captured image 40a, the robotic device 100 detects that the laser beam 30a impinges on an obstacle 32, such as a wall, a sofa, a door or the like. By capturing a number of images, the robotic device 100 is capable of identifying the particular obstacle 32 with high reliability. In case a different type of light source would be used, it may even be envisaged that the illuminated section covers the entire captured image. An advantage of using the laser beam as exemplified in FIG. 1 is that a less amount of image data need to be processed by the robotic device 100.

Now, again with reference to FIG. 1, when the robotic cleaning device 100 moves into position P2, it encounters a doorway 33 where a stair leads down to a lower floor. Again, the robotic device 100 captures an image of the illuminated surface.

Figure 2B:
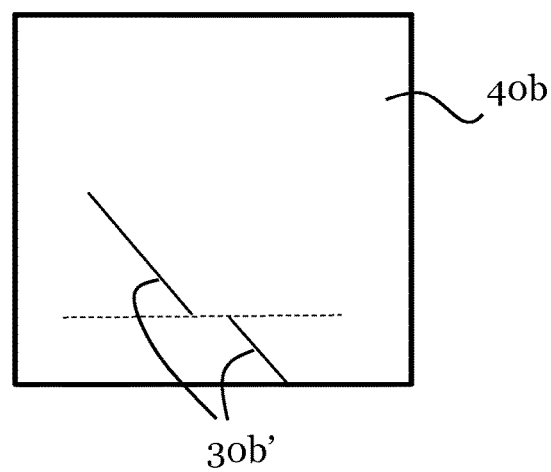
FIG. 2b illustrates an image captured by the camera of the robotic device when in position P2 of FIG. 1 according to an embodiment.

FIG. 2b illustrates the image 40b captured by the camera 123 of the robotic device too when in position P2.

In this image, the laser beam 30b will fall onto the floor 31 and ledge 34 indicated with a dashed line in the image 40b for illustrational purposes. Further, the part of the laser beam 30b falling beyond the ledge 34 will incide on e.g. a wall of a stairwell leading down to the lower floor, which is indicated in the image 40b as a discontinuity in illuminated section 30b' corresponding to the laser beam. It may alternatively be envisaged, depending on how the laser beam 30b falls into the stairwell, that the illuminated section 30b' beyond the ledge 34 will not be present at all in the image 40b. Either way, the illuminated section 30b' is discontinued at the ledge 34.

Hence, in contrast to prior art cliff detectors, the robotic cleaning device 100 is advantageously capable of detecting a cliff well in advance of actually encountering the ledge 34 indicating location of the cliff, since the discontinuity in the illuminated section 30b' representing the projected laser beam indicates that a ledge 34 is encountered.

Figure 3A:
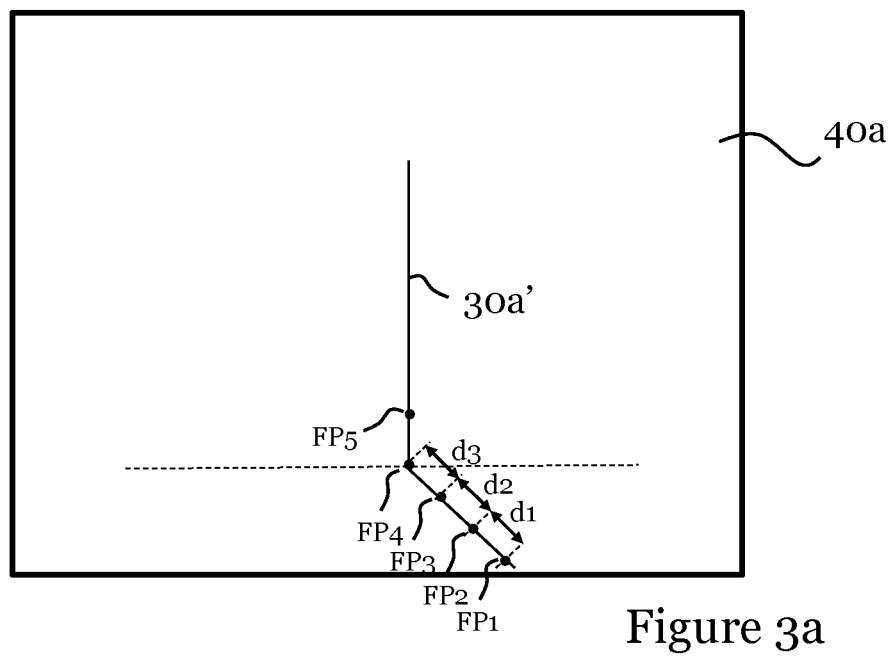
FIG. 3a illustrates the image of FIG. 2a with feature data indicated representing detected objects according to an embodiment.
Figure 3B:
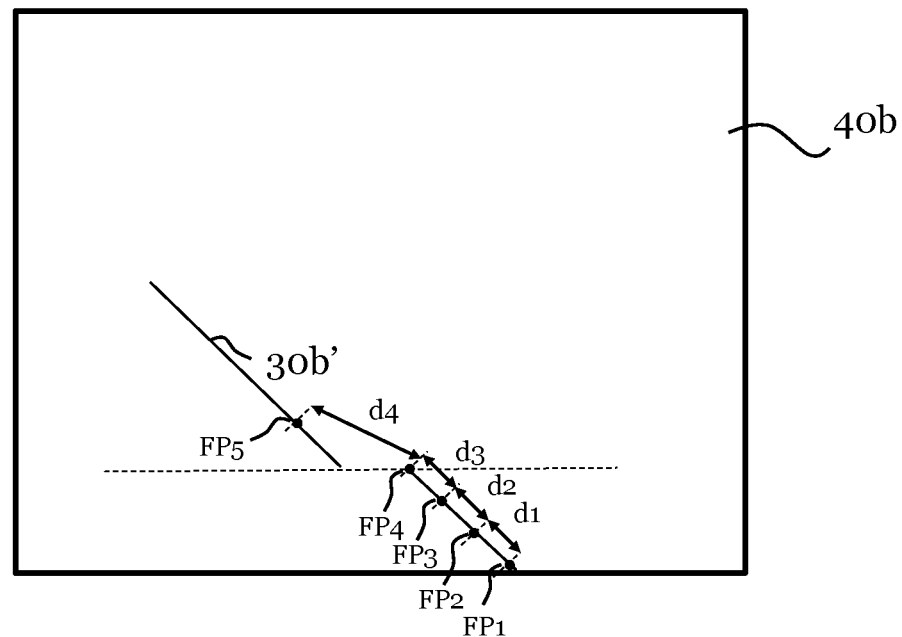
FIG. 3b illustrates the image of FIG. 2b with feature data indicated representing detected objects according to an embodiment.

To this end, reference is made to FIGS. 3a and 3b showing the images 40a and 40b which previously was shown in FIGS. 2a and 2b respectively, but further with feature data indicated in the images representing detected objects. As can be seen, on each detected illuminated section 30a', 30b in the respective image 40a and 40b, five feature points FP1-FP5 are illustrated representing objects detected in the images.

Hence, first with reference to FIG. 3a, the camera 123 of the robotic device 100 is controlled to capture the image 40a when in position P1 of FIG. 1. Again, the laser beam 30a will fall onto the floor 31 and the wall 32 and cause corresponding illuminated section 30a' to be present in the image 40a.

As can be seen, the robotic device too determines distances to objects as represented by the feature data/points FP1-FP5 along the detected laser line 30a' in the image 40a. Hence, from the first feature point FP1 to the second feature point FP2, the distance is d1; from the second feature point FP2 to the third point FP3, the distance is d2; and from the third feature point FP3 to the fourth point FP4, the distance is d3. As can be seen, in this particular example, the distance d1, d2, d3 between each pair of feature points is about the same; no radical change in distance is detected. The robotic device too will thus conclude that the feature points FP1-FP4 represent a floor 31.

Further, the distance from the robotic device 100 up to the fourth feature point FP4, i.e. the accumulated distances d1+d2+d3, is more or less the same as the distance from the robotic device 100 up to the fifth feature point FP5. Hence, the fifth feature FP5 will be considered by the robotic device too to represent an object in the form of a structure rising up from the floor 31, since FP4 and FP5 are located in the same plane. That is, the distance between the fourth feature point FP4 and the fifth feature point FP5 is practically zero. By detecting a further number of points along the illuminated section 30a (each being on the same distance from the robotic device 100), it may be concluded that the object indeed is a wall 32 due to its detected height, and not for instance a sofa or a chair.

Now, with reference to FIG. 3b, where the camera 123 of the robotic device too is controlled to capture the image 40b when in position P2 of FIG. 1. Again, the laser beam 30b will fall onto the floor 31, the ledge 34 and further into the stairwell of the stair leading down to the lower floor the wall 32 and cause corresponding illuminated to section 30b' to be present in the image 40b.

Similar to the scenario described with reference to FIG. 3a, the robotic device 100 determines distances to objects as represented by the feature data/points FP1-Fp5 along the detected laser line 30b in the image 40b. Hence, from the first feature point FP1 to the second feature point FP2, the distance is d1; from the second feature point FP2 to the third point FP3, the distance is d2; and from the third feature point FP3 to the fourth point FP4, the distance is d3. As can be seen, in this particular example, the distance d1, d2, d3 between each pair of feature points is about the same; no radical change in distance is detected.

However, in this embodiment, the illuminated section 30b, is discontinued at the ledge 34. As a result, the distance d4 between the fourth feature point FP4 and the fifth feature point FP5 increases as compared to one or more of the previously determined distances. If the increase in distance d4 up to the fifth feature point FP5 is sufficiently great as compared to one or more of the previously determined distances, the feature point FP5 will be considered to represent a cliff. Advantageously, this cliff is detected long before the robotic device 100 encounters the ledge 34.

In an embodiment, when comparing two or more distances, for instance the third distance d3 with the fourth distance d4, a predetermined threshold value T may be utilized to determine whether the increase in distance is sufficiently great. Thus, the increase is considered sufficiently great when a relation between the at least two compared determined distances d4, d3 complies with the predetermined increase criterion.

For example, it may be determined whether $\Delta_d = d4 - d3 \geq T$, where the threshold value T is appropriately selected. If so, the increase in distance is considered sufficiently great, and thus that a cliff advantageously has been detected.

Alternatively, it may be determined whether d4/d3≥T for concluding that the increase in distance is sufficiently great. In yet an alternative, it may be determined whether d3/d4≤T. Other alternatives of determining whether the increase $\Delta_d$ in distance is to sufficiently great can be envisaged.

Figure 4:
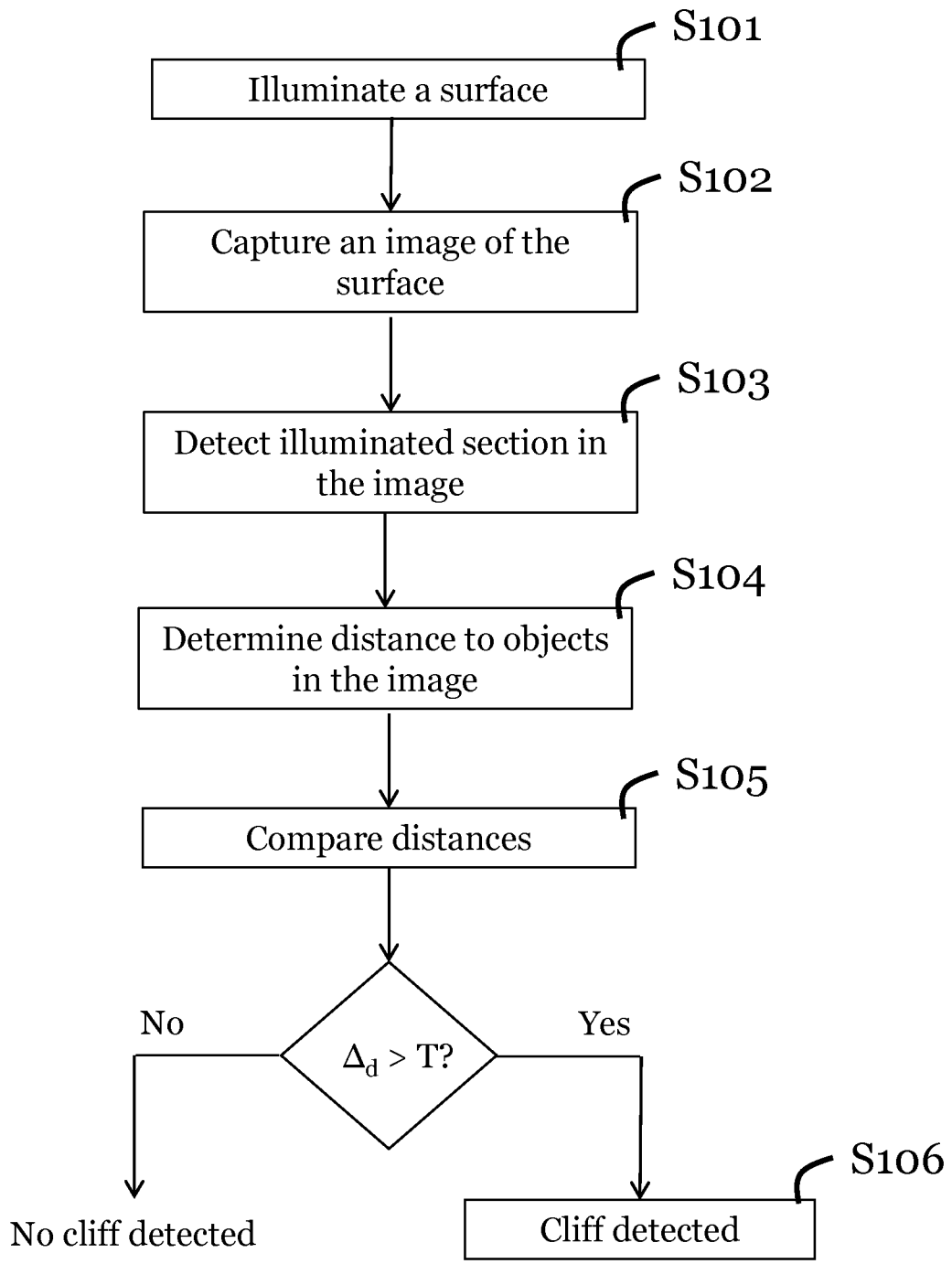
FIG. 4 illustrates a flowchart of the method of detecting a cliff according to an embodiment.

FIG. 4 illustrates a flowchart of the method of detecting a cliff according to an embodiment. In step S101, the robotic device 19 uses a light source, for instance a vertical line laser 127 as previously discussed (or any other appropriate light source), for illuminating a surface 31 over which the robotic device 100 moves.

In step S102, the robotic device 100 uses its camera 123 to capture images 40a, 40b of the illuminated surface.

The laser beam 30a, 30b will fall onto the floor 31/wall 32 and the floor 31/doorway 33, respectively, and cause corresponding illuminated section 30a', 30b' to be present in the images 40a, 40b, which illuminated section is detected by the robotic device too in step S103.

In step S104, the robotic device too determines, as previously has been discussed in detail with reference to FIG. 3b, distances to objects as represented by the feature points FP1-Fp5 along the detected laser line 30b in the image 40b.

Thereafter, in step S105, the determined distances to illuminated objects in the image 40 are compared to determine whether a sufficiently great increase $\Delta_d$ has occurred in the compared distances. For instance, if it is determined that $\Delta_d$=d4−d3≥T, where the threshold value T is appropriately selected, possibly depending on the particular application and surroundings.

In step S106, if the increase in distance d4 up to the fifth feature point FP5 is sufficiently great as compared to the distance d3 up to the fourth feature point FP4, the feature point FP5 will be considered to represent a cliff. Advantageously, this cliff is detected long before the robotic device 100 encounters the ledge 34.

Figure 5:
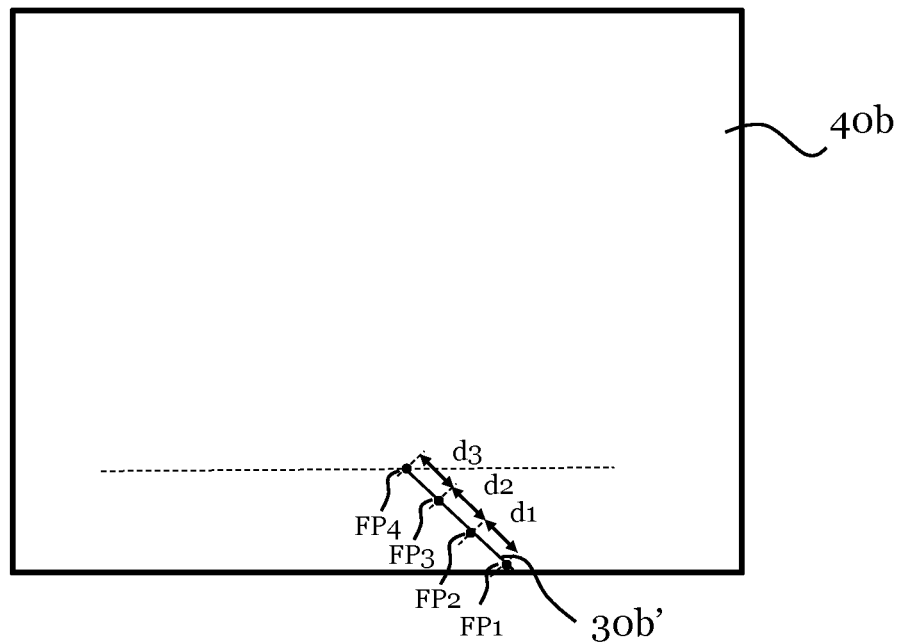
FIG. 5 illustrates the image of FIG. 2b with feature data indicated representing detected objects in a further scenario according to an embodiment.

With reference to FIG. 5, in a further embodiment, if the laser beam 30b falls into the stairway in an angle such that it is not captured in the image 40b, i.e. if the part of the laser beam falling beyond the ledge 34 falls outside of the captured image 40b, the distance to any point along such laser beam 30b will be considered to be infinite (or in practice be given a great numerical value).

Hence, if the detected illuminated section 30b' in the image 40b is discontinued, and the illuminated section 30b' ceases to occur after the discontinuity, a value is assigned to a distance being determined before the discontinuity occurring—for instance to distance d3—such that the assigned value reflects an increase $\Delta_d$ sufficiently great for a cliff to advantageously be detected.

In a further embodiment, the camera 123 is controlled by a controller such as a microprocessor to capture and record images from which the controller creates a representation or layout of the surroundings that the robotic cleaning device 100 is operating in, by extracting feature points from the images representing detected objects and by measuring the distance from the robotic cleaning device 100 to these objects, while the robotic cleaning device 100 is moving across the surface to be cleaned. Thus, the controller derives positional data of the robotic cleaning device 100 with respect to the surface to be cleaned from the detected objects of the recorded images, generates a 3D representation of the surroundings from the derived positional data and controls driving motors to move the robotic cleaning device 100 across the surface to be cleaned in accordance with the generated 3D representation and navigation information supplied to the robotic cleaning device 100 such that the surface to be cleaned can be autonomously navigated by taking into account the generated 3D representation. Since the derived positional data will serve as a foundation for the navigation of the robotic cleaning device, it is important that the positioning is correct; the robotic device will otherwise navigate according to a "map" of its surroundings that is misleading.

The 3D representation generated from the images recorded by the camera 123 thus facilitates detection of obstacles in the form of walls, floor lamps, table legs, around which the robotic cleaning device must navigate as well as rugs, carpets, doorsteps, etc., that the robotic cleaning device 100 must traverse. The robotic cleaning device 100 is hence configured to learn about its environment or surroundings by operating/cleaning.

The robotic cleaning device 100 will advantageously add an indication of detected cliff(s) to the created representation of its surroundings. Thus, by adding to the created representation an indication of the ledge 34, it is possible for the robotic cleaning device to plan a cleaning path to be traversed well in advance and further to move very close to, and along, the ledge 34 since it is included in the representation of the surroundings of the robotic cleaning device 100.

Figure 6:
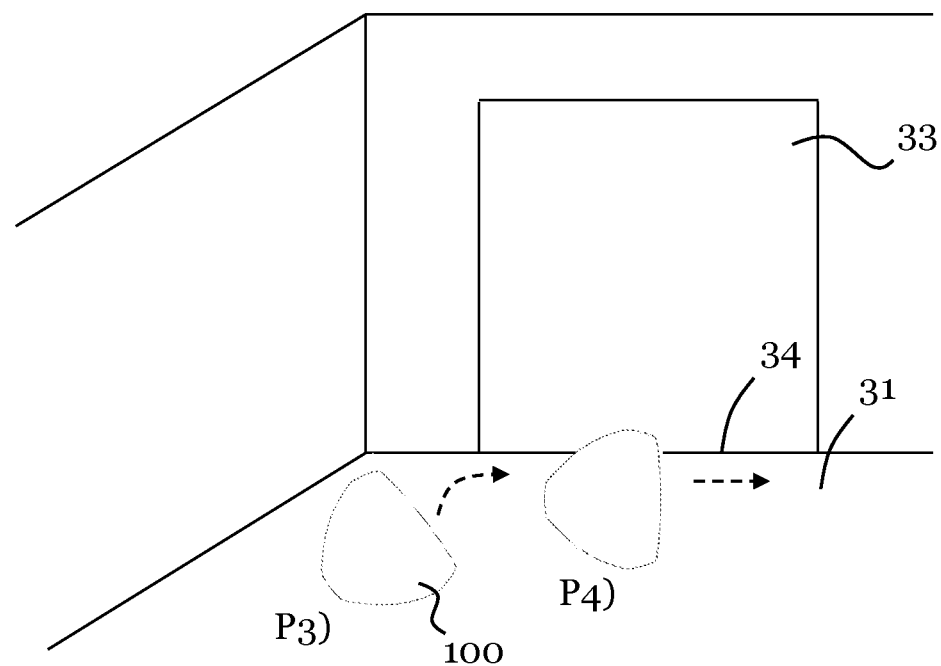
FIG. 6 illustrates movement of the robotic cleaning device as a result of cliff detection according to an embodiment.

This is illustrated in FIG. 6, where the robotic cleaning device moves from position P3 and advantageously knows well in advance where the doorway 33 and the ledge 34 is located. The robotic device too will thus move into position P4 and travel flush to ledge 34 (and even with a part of a body of the robotic device protruding out from the ledge 34).

Further in contrast to prior art cliff detectors, which detect a cliff just shortly before approaching the cliff and therefore needs to move at an amble pace to reduce the risk of falling down the cliff, it is possible with the invention to approach a cliff at a relatively high speed, since the robotic cleaning device too knows in advance exactly where the cliff is located and adds, to the created representation, and indication thereof accordingly.

Figure 7:
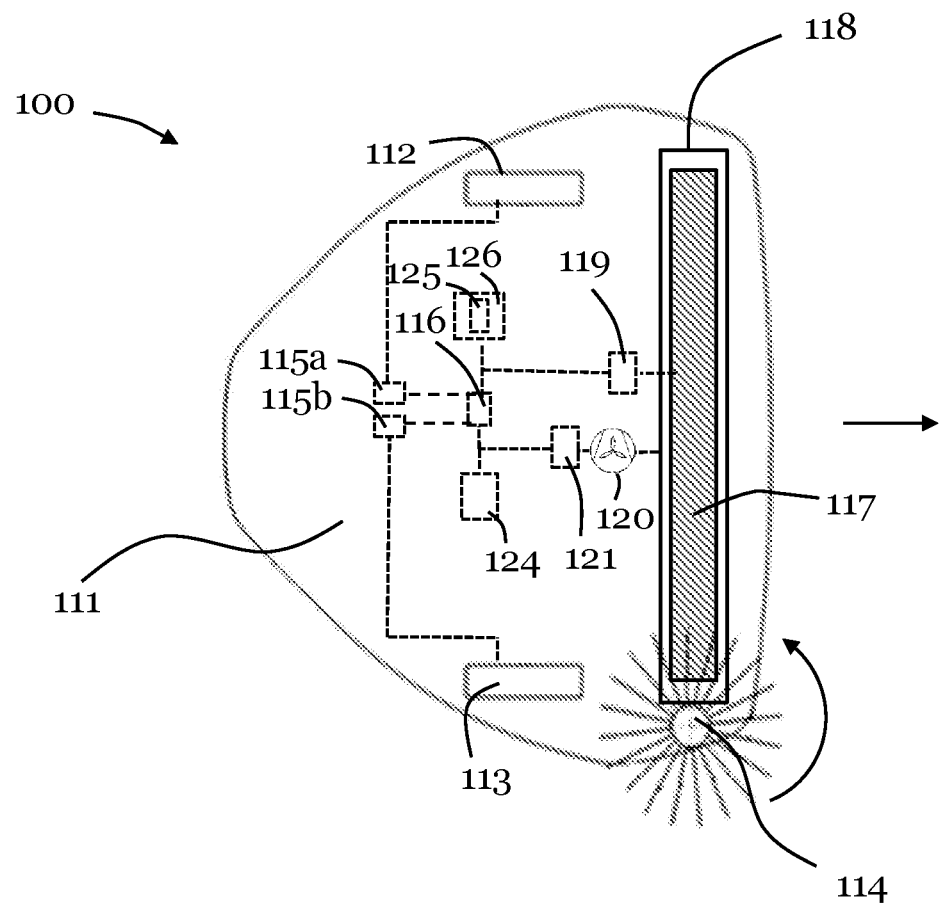
FIG. 7 shows a view of a robotic cleaning device according to an embodiment.

Even though it is envisaged that the invention may be performed by any appropriate robotic cleaning device being equipped with sufficient processing intelligence, FIG. 7 shows a robotic cleaning device 100 according to an embodiment of the present invention in a bottom view, i.e. the bottom side of the robotic cleaning device is shown. The arrow indicates the forward direction of the robotic cleaning device 100 being illustrated in the form of a robotic vacuum cleaner.

The robotic cleaning device 100 comprises a main body 111 housing components such as a propulsion system comprising driving means in the form of two electric wheel motors 115a, 115b for enabling movement of the driving wheels 112, 113 such that the cleaning device can be moved over a surface to be cleaned. Each wheel motor 115a, 115b is capable of controlling the respective driving wheel 112, 113 to rotate independently of each other in order to move the robotic cleaning device 100 across the surface to be cleaned. A number of different driving wheel arrangements, as well as various wheel motor arrangements, can be envisaged. It should be noted that the robotic cleaning device may have any appropriate shape, such as a device having a more traditional circular-shaped main body, or a triangular-shaped main body. As an alternative, a track propulsion system may be used or even a hovercraft propulsion system. The propulsion system may further be arranged to cause the robotic cleaning device too to perform any one or more of a yaw, pitch, translation or roll movement.

A controller 116 such as a microprocessor controls the wheel motors 115a, 115b to rotate the driving wheels 112, 113 as required in view of information received from an obstacle detecting device (not shown in FIG. 7) for detecting obstacles in the form of walls, floor lamps, table legs, around which the robotic cleaning device must navigate. The obstacle detecting device may be embodied in the form of a 3D sensor system registering its surroundings, implemented by means of e.g. a 3D camera, a camera in combination with lasers, a laser scanner, etc. for detecting obstacles and communicating information about any detected obstacle to the microprocessor 116. The microprocessor 116 communicates with the wheel motors 115a, 115b to control movement of the wheels 112, 113 in accordance with information provided by the obstacle detecting device such that the robotic cleaning device 100 can move as desired across the surface to be cleaned.

Further, the main body 111 may optionally be arranged with a cleaning member 117 for removing debris and dust from the surface to be cleaned in the form of a rotatable brush roll arranged in an opening 118 at the bottom of the robotic cleaner 100. Thus, the rotatable brush roll 117 is arranged along a horizontal axis in the opening 118 to enhance the dust and debris collecting properties of the cleaning device 100. In order to rotate the brush roll 117, a brush roll motor 119 is operatively coupled to the brush roll to control its rotation in line with instructions received from the controller 116.

Moreover, the main body 111 of the robotic cleaner 100 comprises a suction fan 20 creating an air flow for transporting debris to a dust bag or cyclone arrangement (not shown) housed in the main body via the opening 118 in the bottom side of the main body 111. The suction fan 120 is driven by a fan motor 121 communicatively connected to the controller 116 from which the fan motor 121 receives instructions for controlling the suction fan 120. It should be noted that a robotic cleaning device having either one of the rotatable brush roll 117 and the suction fan 20 for transporting debris to the dust bag can be envisaged. A combination of the two will however enhance the debris-removing capabilities of the robotic cleaning device 100.

The main body 111 or the robotic cleaning device too is further equipped with an inertia measurement unit (IMU) 124, such as e.g. a gyroscope and/or an accelerometer and/or a magnetometer or any other appropriate device for measuring displacement of the robotic cleaning device too with respect to a reference position, in the form of e.g. orientation, rotational velocity, gravitational forces, etc. A three-axis gyroscope is capable of measuring rotational velocity in a roll, pitch and yaw movement of the robotic cleaning device 100. A three-axis accelerometer is capable of measuring acceleration in all directions, which is mainly used to determine whether the robotic cleaning device is bumped or lifted or if it is stuck (i.e. not moving even though the wheels are turning). The robotic cleaning device 100 further comprises encoders (not shown in FIG. 7) on each drive wheel 112, 113 which generate pulses when the wheels turn. The encoders may for instance be magnetic or optical. By counting the pulses at the controller 116, the speed of each wheel 112, 113 can be determined. By combining wheel speed readings with gyroscope information, the controller 116 can perform so called dead reckoning to determine position and heading of the cleaning device 100.

The main body 111 may further be arranged with a rotating side brush 114 adjacent to the opening 118, the rotation of which could be controlled by the drive motors 115a, 115b, the brush roll motor 119, or alternatively a separate side brush motor (not shown). Advantageously, the rotating side brush 114 sweeps debris and dust such from the surface to be cleaned such that the debris ends up under the main body 111 at the opening 118 and thus can be transported to a dust chamber of the robotic cleaning device. Further advantageous is that the reach of the robotic cleaning device 100 will be improved, and e.g. corners and areas where a floor meets a wall are much more effectively cleaned. As is illustrated in FIG. 7, the rotating side brush 114 rotates in a direction such that it sweeps debris towards the opening 118 such that the suction fan 20 can transport the debris to a dust chamber. The robotic cleaning device too may comprise two rotating side brushes arranged laterally on each side of, and adjacent to, the opening 118.

With further reference to FIG. 7, the controller/processing unit 116 embodied in the form of one or more microprocessors is arranged to execute a computer program 125 downloaded to a suitable storage medium 126 associated with the microprocessor, such as a Random Access Memory (RAM), a Flash memory or a hard disk drive. The controller 116 is arranged to carry out a method according to embodiments of the present invention when the appropriate computer program 125 comprising computer-executable instructions is downloaded to the storage medium 126 and executed by the controller 116. The storage medium 126 may also be a computer program product comprising the computer program 125. Alternatively, the computer program 125 may be transferred to the storage medium 126 by means of a suitable computer program product, such as a digital versatile disc (DVD), compact disc (CD) or a memory stick. As a further alternative, the computer program 125 may be downloaded to the storage medium 126 over a wired or wireless network. The controller 116 may alternatively be embodied in the form of a digital signal processor (DSP), an application specific integrated circuit (ASIC), a field-programmable gate array (FPGA), a complex programmable logic device (CPLD), etc.

Figure 8:
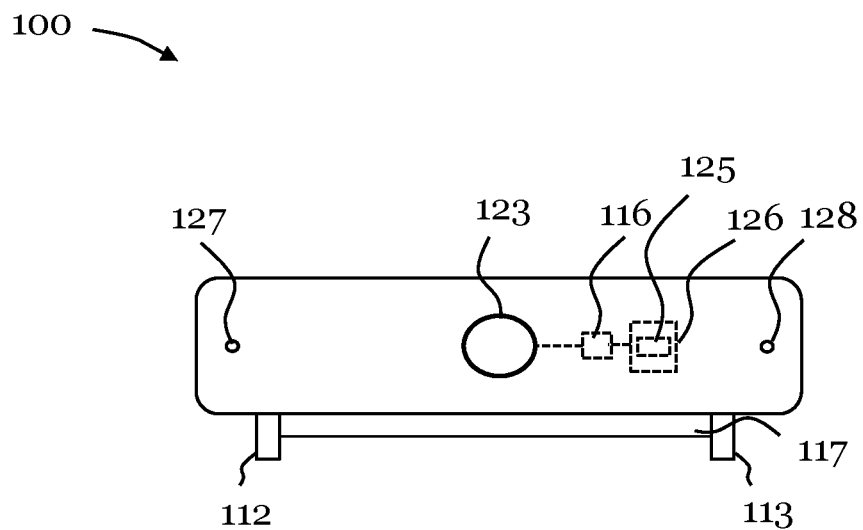
FIG. 8 shows a further view of a robotic cleaning device according to an embodiment.

FIG. 8 shows a front view of the robotic cleaning device too of FIG. 7 in an embodiment of the present invention illustrating the previously mentioned obstacle detecting device in the form of a 3D sensor system comprising at least a camera 123 and a first and a second line laser 127, 128, which may be horizontally or vertically oriented line lasers. Further shown is the controller 116, the main body 111, the driving wheels 112, 113, and the rotatable brush roll 117 previously discussed with reference to FIG. 6. The controller 116 is operatively coupled to the camera 123 for recording images of a vicinity of the robotic cleaning device 100. The first and second line lasers 127, 128 may preferably be vertical line lasers and are arranged lateral of the camera 123 and configured to illuminate a height and a width that is greater than the height and width of the robotic cleaning device 100. Further, the angle of the field of view of the camera 123 is preferably smaller than the space illuminated by the first and second line lasers 127, 128. The camera 123 is controlled by the controller 116 to capture and record a plurality of images per second. Data from the images is extracted by the controller 116 and the data is typically saved in the memory 126 along with the computer program 125.

The first and second line lasers 127, 128 are typically arranged on a respective side of the camera 123 along an axis being perpendicular to an optical axis of the camera. Further, the line lasers 127, 128 are directed such that their respective laser beams intersect within the field of view of the camera 123. Typically, the intersection coincides with the optical axis of the camera 123.

The first and second line laser 127, 128 are configured to scan, preferably in a vertical orientation, the vicinity of the robotic cleaning device 100, normally in the direction of movement of the robotic cleaning device 100. The first and second line lasers 127, 128 are configured to send out laser beams, which illuminate furniture, walls and other objects of e.g. a room to be cleaned. The camera 123 is controlled by the controller 116 to capture and record images from which the controller 116 creates a representation or layout of the surroundings that the robotic cleaning device 100 is operating in, by extracting features from the images and by measuring the distance covered by the robotic cleaning device 100, while the robotic cleaning device too is moving across the surface to be cleaned. Thus, the controller 16 derives positional data of the robotic cleaning device too with respect to the surface to be cleaned from the recorded images, generates a 3D representation of the surroundings from the derived positional data and controls the driving motors 115a, 115b to move the robotic cleaning device across the surface to be cleaned in accordance with the generated 3D representation and navigation information supplied to the robotic cleaning device 100 such that the surface to be cleaned can be navigated by taking into account the generated 3D representation. Since the derived positional data will serve as a foundation for the navigation of the robotic cleaning device, it is important that the positioning is correct; the robotic device will otherwise navigate according to a "map" of its surroundings that is misleading.

The 3D representation generated from the images recorded by the 3D sensor system thus facilitates detection of obstacles in the form of walls, floor lamps, table legs, around which the robotic cleaning device must navigate as well as rugs, carpets, doorsteps, etc., that the robotic cleaning device too must traverse. The robotic cleaning device 100 is hence configured to learn about its environment or surroundings by operating/cleaning.

Hence, the 3D sensor system comprising the camera 123 and the first and second vertical line lasers 127, 128 is arranged to record images of a vicinity of the robotic cleaning from which objects/obstacles may be detected. The controller 116 is capable of positioning the robotic cleaning device 100 with respect to the detected obstacles and hence a surface to be cleaned by deriving positional data from the recorded images. From the positioning, the controller 116 controls movement of the robotic cleaning device 100 by means of controlling the wheels 112, 113 via the wheel drive motors 115a, 115b, across the surface to be cleaned.

The derived positional data facilitates control of the movement of the robotic cleaning device 100 such that cleaning device can be navigated to move very close to an object, and to move closely around the object to remove debris from the surface on which the object is located. Hence, the derived positional data is utilized to move flush against the object, being e.g. a chair, a table, a sofa, a thick rug or a wall. Typically, the controller 116 continuously generates and transfers control signals to the drive wheels 112, 113 via the drive motors 115a, 115b such that the robotic cleaning device 100 is navigated close to the object.

It should further be noted that while the embodiments of the invention has been discussed in the context of using a camera and one or two line lasers for illuminating a surface over which the robotic cleaning device 100 moves, it would further be possible to use known 3D sensors utilizing time of flight measurements of an image being completely illuminated. With such a time of flight 3D sensor, the distance in a captured image would be determined for each pixel and distances to detected objects may be determined in line with the above.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for a robotic cleaning device of performing cliff detection along a surface over which the robotic cleaning device moves, the method comprising:
   illuminating the surface with a corresponding line laser;
   capturing an image of the surface;
   detecting at least one illuminated section illuminated by the corresponding line laser in the captured image;
   determining distances between successive measurement points along the corresponding line laser, the successive measurement points corresponding to multiple points in front of the robotic cleaning device that are illuminated by the corresponding line laser in the captured image;
   comparing at least two of the determined distances to one another; and
   detecting an object in the captured image as a cliff when a difference between the at least two compared determined distances exceeds a threshold value.

2. A non-transitory computer readable medium, the computer readable medium having a computer program stored thereon, that when executed by a processor, instructs the processor to perform the steps of:
   illuminating the surface with a corresponding line laser;
   capturing an image of the surface;
   detecting at least one illuminated section illuminated by the corresponding line laser in the captured image;
   determining distances between successive measurement points along the corresponding line laser, the successive measurement points corresponding to multiple points in front of the robotic cleaning device that are illuminated by the corresponding line laser in the captured image;
   comparing at least two of the determined distances to one another; and
   detecting an object in the captured image as a cliff when a difference between the at least two compared determined distances exceeds a threshold value.

3. The method of claim 1, further comprising:
   creating a representation of surroundings of the robotic cleaning device from detected objects of the captured image; and
   adding an indication of the detected cliff to the created representation.

4. The method of claim 1, further comprising planning a cleaning path to be traversed by taking into account the detected cliff.

5. The method of claim 1, wherein
   the step of detecting at least one illuminated section in the captured image further comprises detecting that a discontinuity occurs in the at least one illuminated section in the captured image, where the at least one illuminated section ceases to occur in the image beyond the detected discontinuity; and
   the step of determining distance to objects in the at least one illuminated section of the captured image further comprises assigning a value to a distance being determined before the discontinuity such that the assigned value reflects a sufficiently great increase.

6. A robotic cleaning device comprising:
a propulsion system arranged to move the robotic cleaning device over a surface to be cleaned;
a corresponding line laser arranged to illuminate the surface;
a camera arranged to capture an image of the surface; and
a controller configured to control the propulsion system to move the robotic cleaning device and to control the camera to capture the image; wherein the controller further is configured to:
detect at least one illuminated section illuminated by the corresponding line laser in the captured image;
determine distances between successive measurement points along the corresponding line laser, the successive measurement points corresponding to multiple points in front of the robotic cleaning device that are illuminated by the corresponding line laser in the captured image;
compare at least two of the determined distances to one another; and
detect an object in the captured image as a cliff when a difference between the at least two compared determined distances exceeds a threshold value.

7. The robotic cleaning device of claim 6, wherein the line laser is a vertical line laser.

8. The robotic cleaning device of claim 6, the controller further being configured to:
create a representation of surroundings of the robotic cleaning device from detected objects of the captured image; and
add an indication of the detected cliff to the created representation.

9. The robotic cleaning device of claim 6, the controller further being configured to plan a cleaning path to be traversed by taking into account the detected cliff.

10. The robotic cleaning device of claim 6, the controller further being configured to:
when detecting at least one illuminated section in the captured image, detect that a discontinuity occurs in the at least one illuminated section in the capture image, where the at least one illuminated section cease to occur in the image beyond the detected discontinuity; and
when determining distance to objects in the at least one illuminated section of the captured image, assign a value to a distance being determined before the discontinuity such that the assigned value reflects a sufficiently great increase.

11. The robotic cleaning device of claim 7, further comprising another vertical line laser arranged to illuminate the surface.

12. The robotic cleaning device of claim 11, wherein the vertical line laser and the another vertical line laser are arranged on respective sides of the camera along an axis being perpendicular to an optical axis of the camera.

* * * * *